(12) United States Patent
Kao

(10) Patent No.: US 7,897,706 B2
(45) Date of Patent: Mar. 1, 2011

(54) POLYMERIZATION PROCESS USING A SUPPORTED, TREATED CATALYST SYSTEM

(75) Inventor: Sun-Chueh Kao, Pearland, TX (US)

(73) Assignee: Univation Technologies, LLC, Houston, TX (US)

( * ) Notice: Subject to any disclaimer, the term of this patent is extended or adjusted under 35 U.S.C. 154(b) by 76 days.

(21) Appl. No.: 12/215,645

(22) Filed: Jun. 27, 2008

(65) Prior Publication Data

US 2008/0293895 A1 Nov. 27, 2008

Related U.S. Application Data

(62) Division of application No. 10/748,014, filed on Dec. 30, 2003, now Pat. No. 7,410,926.

(51) Int. Cl.
*C08F 4/44* (2006.01)
*C08F 4/613* (2006.01)
*C08F 4/652* (2006.01)
*C08F 4/6592* (2006.01)

(52) U.S. Cl. ......... 526/114; 526/113; 526/115; 526/116; 526/117; 526/118; 526/119; 526/124.3; 526/160; 526/171; 526/172

(58) Field of Classification Search .................. 526/113, 526/114, 115, 116, 117, 118, 119, 124.3, 526/160, 161, 171, 172
See application file for complete search history.

(56) References Cited

U.S. PATENT DOCUMENTS

| | | | |
|---|---|---|---|
| 4,271,060 A | 6/1981 | Hubby | 260/33.6 A |
| 4,543,399 A | 9/1985 | Jenkins, III et al. | 526/70 |
| 4,588,790 A | 5/1986 | Jenkins, III et al. | 526/70 |
| 5,001,205 A | 3/1991 | Hoel | 526/128 |
| 5,026,798 A | 6/1991 | Canich | 526/127 |
| 5,028,670 A | 7/1991 | Chinh et al. | 526/73 |
| 5,236,998 A | 8/1993 | Lundeen et al. | 525/52 |
| 5,317,036 A | 5/1994 | Brady, III et al. | 523/223 |
| 5,352,749 A | 10/1994 | DeChellis et al. | 526/68 |
| 5,405,922 A | 4/1995 | DeChellis et al. | 526/68 |
| 5,436,304 A | 7/1995 | Griffin et al. | 526/68 |
| 5,453,471 A | 9/1995 | Bernier et al. | 526/68 |
| 5,462,999 A | 10/1995 | Griffin et al. | 526/68 |
| 5,525,678 A | 6/1996 | Mink et al. | 525/246 |
| 5,589,555 A | 12/1996 | Zboril et al. | 526/64 |
| 5,616,661 A | 4/1997 | Eisinger et al. | 526/88 |
| 5,668,228 A | 9/1997 | Chinh et al. | 526/67 |
| 5,703,187 A | 12/1997 | Timmers | 26/282 |
| 5,747,406 A | 5/1998 | Reichle et al. | 502/117 |
| 5,849,852 A | 12/1998 | Koch et al. | 526/96 |
| 5,859,653 A | 1/1999 | Aoki | 347/8 |
| 5,869,723 A | 2/1999 | Hinokuma et al. | 556/402 |
| 6,013,820 A * | 1/2000 | Sangokoya | 556/187 |
| 6,031,120 A | 2/2000 | Tam | 558/78 |
| 6,069,213 A | 5/2000 | Nemzek | 526/113 |
| 6,214,949 B1 | 4/2001 | Reddy et al. | 526/114 |
| 6,268,445 B1 | 7/2001 | McAdon et al. | 526/134 |
| 6,399,532 B1 | 6/2002 | Dorer et al. | 502/117 |
| 6,410,474 B1 | 6/2002 | Nowlin et al. | 502/113 |
| 6,486,089 B1 * | 11/2002 | Kissin et al. | 502/104 |
| 6,555,631 B1 * | 4/2003 | Wang et al. | 526/113 |
| 6,605,675 B2 | 8/2003 | Mawson et al. | 526/115 |
| 6,875,828 B2 | 4/2005 | Kuo et al. | 526/114 |
| 7,410,926 B2 | 8/2008 | Kao | 502/113 |

FOREIGN PATENT DOCUMENTS

| | | |
|---|---|---|
| EP | 0511665 B1 | 7/1998 |
| EP | 0767184 B1 | 8/1999 |
| WO | WO 98/07515 | 2/1998 |
| WO | WO 98/32775 | 7/1998 |
| WO | WO 98/57998 | * 12/1998 |
| WO | WO 00/75198 A1 | 12/2000 |

* cited by examiner

*Primary Examiner* — Roberto Rabago

(57) ABSTRACT

The present invention relates to a supported, treated catalyst system and its use in a process for polymerizing olefin(s). More particularly, it provides a supported, treated catalyst system produced by a process comprising the steps of: (a) forming a supported bimetallic catalyst system comprising a first catalyst component and a metallocene catalyst compound; and (b) contacting the supported bimetallic catalyst system of (a) with at least one methylalumoxane-activatable compound.

32 Claims, 3 Drawing Sheets

POLYMERIZATION PROCESS USING A SUPPORTED, TREATED CATALYST SYSTEM

CROSS REFERENCE TO RELATED APPLICATIONS

This application is a divisional of U.S. patent application Ser. No. 10/748,014, filed Dec. 30, 2003, now U.S. Pat. No. 7,410,926, and the disclosure of which is herein incorporated by reference in its entirety.

FIELD OF THE INVENTION

The present invention relates to a supported, treated catalyst system and its use in a process for polymerizing olefin(s). In particular, the invention is directed to a supported, treated catalyst system that includes a bimetallic catalyst system that has been contacted with at least one methylalumoxane-activable compound, and polymerization processes employing such a supported, treated catalyst system.

BACKGROUND OF THE INVENTION

Advances in polymerization and catalysis have resulted in the ability to produce many new polymers having improved physical and chemical properties useful in a wide variety of superior products and applications. The development of new catalysts has greatly expanded the choice of polymerization processes (solution, slurry, high pressure or gas phase) for producing a particular polymer. Also, advances in polymerization technology have provided more efficient, highly productive and economically enhanced processes. Especially illustrative of these advances is the development of the technology field utilizing metallocene catalyst systems.

As with any new technology field, particularly in the polyolefins industry, a small savings in cost often determines whether a commercial endeavor is even feasible. This aspect of the metallocene technology field is evident by the number of participants in the industry seeking new ways to reduce cost. In particular, there has been tremendous focus in the industry on developing new and improved metallocene catalyst systems. Some have focused on designing the catalyst systems to produce new polymers, others on improved operability, and many more on improving catalyst productivity. The productivity of a catalyst, that is, the amount of polymer produced per gram of the catalyst per hour, usually is the key economic factor that can make or break a new commercial development in the polyolefins industry.

From the early stages in the metallocene technology field, beginning with the discovery of the utility of alumoxane as a cocatalyst in the early 1980's, to the discovery of substitutions on the ligands of the metallocene compounds, through the development of non-coordinating anions, and today with the ever-increasing number of new metallocene compounds, catalyst productivity has been a primary focus.

A need still exists for higher productivity catalyst systems capable of providing the efficiencies necessary for implementing commercial polyolefin processes. Further, it has been found that conventional olefin polymerization processes that employ catalyst systems that use methylalumoxane as an activator often fail to efficiently utilize all the methylalumoxane present in the catalyst system. This is problematic because methylalumoxane represents a significant cost factor in the catalyst system. Thus, it would be highly advantageous to have a polymerization process and catalyst system capable of producing polyolefins with improved catalyst productivities and improved methylalumoxane efficiency.

SUMMARY OF THE INVENTION

The present invention relates to a supported, treated catalyst system and its use in a process for polymerizing olefin(s). In particular, the invention is directed to a supported, treated catalyst system that includes a supported bimetallic catalyst system that has been contacted with at least one methylalumoxane-activatable compound.

In one exemplary embodiment, the present invention provides a process for polymerizing olefins by contacting, in a reactor: (a) ethylene and at least one comonomer selected from the group consisting of C4 to C8 alpha olefins; and (b) a supported, treated catalyst system that includes a first catalyst component, a second catalyst component, and at least one methylalumoxane-activatable compound.

In another exemplary embodiment, a supported, treated catalyst system is produced by a process comprising the steps of: (a) forming a supported bimetallic catalyst system comprising a first catalyst component and a second catalyst component; and (b) contacting the supported bimetallic catalyst system with at least one methylalumoxane-activatable compound.

BRIEF DESCRIPTION OF THE DRAWINGS

A more complete understanding of the present disclosure and advantages thereof may be acquired by referring to the following description taken in conjunction with the accompanying drawings, wherein.

DETAILED DESCRIPTION

General Definitions

Figure 1:
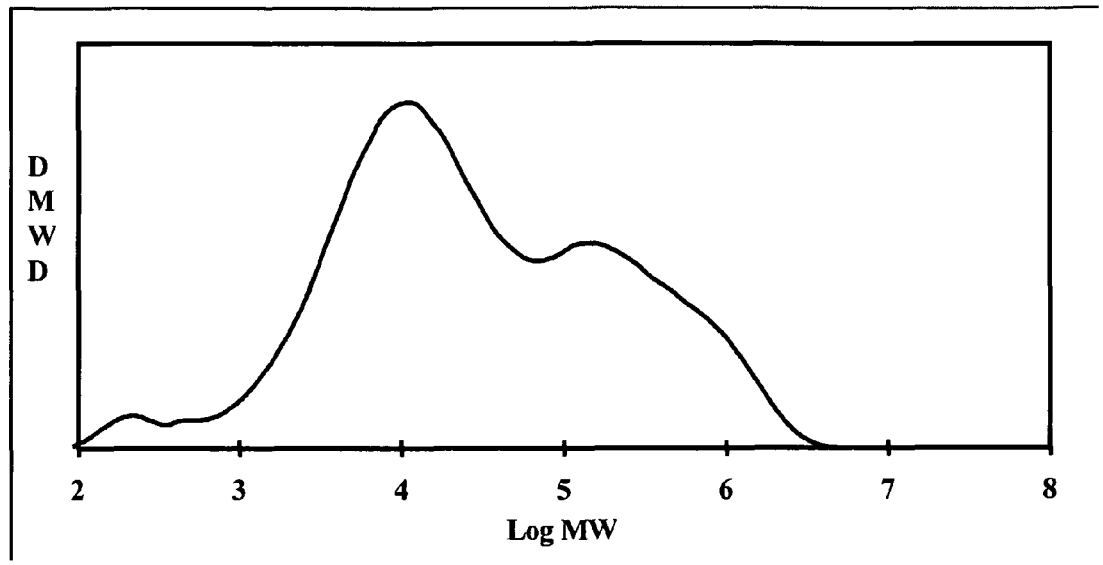
FIG. 1 illustrates a molecular weight distribution for an exemplary supported bimetallic catalyst composition.

As used herein, in reference to Periodic Table "Groups" of Elements, the "new" numbering scheme for the Periodic Table Groups is used, as in the CRC HANDBOOK OF CHEMISTRY AND PHYSICS (David R. Lide ed., CRC Press $81^{st}$ ed. 2000).

As used herein, the phrase "catalyst system" includes at least one "catalyst component" and at least one "activator," both of which are described further herein. The catalyst system may also include other components (such as supports, for example), and is not limited to the catalyst component and/or activator alone, or in combination. The catalyst system may include any number of catalyst components, in any combination as described herein, and may also include any activator in any combination as described herein. In one embodiment of the present invention, a "supported, treated catalyst system" is provided that includes a "bimetallic catalyst system" that has been contacted with at least one compound that can be activated by methylalumoxane ("MAO-activatable compound").

As used herein, the term "bimetallic catalyst" or "bimetallic catalyst system" refers to two or more catalyst components that may be used in combination with at least one activator and a support material.

As used herein, the phrase "catalyst compound" includes any compound that, once appropriately activated, is capable of catalyzing the polymerization or oligomerization of olefins, the catalyst compound including at least one Group 3 to Group 12 atom, and optionally at least one leaving group bound thereto.

As used herein, the phrase "leaving group" refers to one or more chemical moieties bound to the metal center of the catalyst component, which can be abstracted from the catalyst component by an activator, thus producing a species active towards olefin polymerization or oligomerization. The activator is described further below.

As used herein, the term "substituted" means that the group following that term possesses at least one moiety in place of one or more hydrogens in any position, which moieties are selected from such groups as halogen radicals (e.g., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls include, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

As used herein, structural formulas are employed in manners that are commonly understood in the chemical arts. For example, the lines ("—") that are used to represent associations between a metal atom ("M," Group 3 to Group 12 atoms) and a ligand or ligand atom (e.g., cyclopentadienyl, nitrogen, oxygen, halogen ions, alkyl, etc.), as well as the phrases "associated with," "bonded to" and "bonding," are not limited to representing a certain type of chemical bond; rather, these lines and phrases are meant to represent a "chemical bond" in general. As used herein, the phrase "chemical bond" is defined as an attractive force between atoms that is strong enough to permit the combined aggregate to function as a unit, or "compound."

A certain stereochemistry for a given structure or part of a structure should not be implied unless so stated for a given structure or apparent by use of commonly used bonding symbols, such as by dashed lines and/or heavy lines.

Unless stated otherwise, no embodiment of the present invention is herein limited to the oxidation state of the metal atom "M" as defined below in the individual descriptions and examples that follow. The ligation of the metal atom "M" is such that the compounds described herein are neutral, unless otherwise indicated.

As used herein, the term "bimodal," when used to describe a polymer or polymer composition (e.g., polyolefins such as polypropylene or polyethylene, or other homopolymers, copolymers or terpolymers) means "bimodal molecular weight distribution," which is understood as having the broadest definition persons in the pertinent art have given that term as reflected in printed publications and issued patents. For example, a single composition that includes polyolefins with at least one identifiable high molecular weight distribution and polyolefins with at least one identifiable low molecular weight distribution is considered to be a "bimodal" polyolefin, as that term is used herein. In a particular embodiment, other than having different molecular weights, the high molecular weight polyolefin and the low molecular weight polyolefin may be essentially the same type of polymer, for example, polyethylene.

As used herein, the term "productivity" means the weight of polymer produced per weight of the catalyst used in the polymerization process per time period (e.g., grams polymer/(gram catalyst·hour).

As used herein, the term "dehydrated" is understood as having the broadest definition that persons in the pertinent art have given that term in describing catalyst support materials (for example, silica) as reflected in printed publications and issued patents, and includes any material (for example, a support particle) from which a majority of the contained/adsorbed water has been removed.

As used herein, the term "MAO efficiency" refers to the grams of polyethylene produced per mmol aluminum (contributed by MAO) present on the supported (or supported, treated) catalyst per hour when the supported (or supported, treated) catalyst system is used in a polymerization process.

Bimetallic Catalyst

As used herein, the term "supported bimetallic catalyst" or "supported bimetallic catalyst composition" refers to a bimetallic catalyst system as used in combination with a support material, wherein one or more of the components that make up the bimetallic catalyst system may be bound to the support. In a particular embodiment, the bimetallic catalyst used in accordance with the present invention includes two catalyst components. In a more particular embodiment, the bimetallic catalyst includes a "first catalyst component" and a "second catalyst component."

As used herein, the term "first catalyst component" refers to any catalyst component other than the second catalyst component. In certain exemplary embodiments, the first catalyst component is a non-metallocene catalyst component, examples of which include, but are not limited to, titanium or vanadium based Ziegler-Natta catalyst compounds as described further herein. In an exemplary embodiment, the first catalyst component is titanium tetrachloride.

As used herein, the term "non-metallocene catalyst component" refers to any catalyst component that is neither a metallocene nor one of the metallocene-type catalyst compounds identified below.

As used herein, the term "second catalyst component" refers to any catalyst component that is different from a first catalyst component. In an exemplary embodiment, the second catalyst component is a metallocene catalyst component.

In an exemplary embodiment, each different catalyst compound that comprises the bimetallic catalyst resides, or is supported, on a single type of support such that, on average, each particle of support material includes both the first and second catalyst components. In another exemplary embodiment, the first catalyst component is supported separately from the second catalyst component such that, on average, any given particle of support material comprises only the first or the second catalyst component. In this later embodiment, each supported catalyst component may be introduced into the polymerization reactor sequentially in any order, alternately in parts, or simultaneously.

In a particular embodiment, the first catalyst component includes a titanium non-metallocene catalyst component, from which a higher molecular weight resin (e.g., >ca 100,000 amu) can be produced. In a particular embodiment, the second catalyst component includes a metallocene component, from which a lower molecular weight resin (e.g., <ca 100,000 amu) can be produced. Accordingly, when such bimetallic catalyst is included in the supported, treated catalyst systems of the present invention, polymerization in the presence of such supported, treated catalyst system may provide a bimodal polyolefin composition that includes a low molecular weight component and a high molecular weight component.

In one exemplary embodiment, an "enhanced silica" is prepared as described herein and constitutes the support for the bimetallic catalyst. In an exemplary embodiment, the first catalyst component is a non-metallocene compound that is first combined with the enhanced silica, to provide a supported non-metallocene composition that is combined with the second catalyst component.

Various methods of affixing two different catalyst components (albeit a different combination of catalysts) to a support can be used. One procedure for preparing a supported bimetallic catalyst can include providing a supported first catalyst component, contacting a slurry that includes the first catalyst component in a non-polar hydrocarbon with a solution that includes the second catalyst component, which may also include an activator, drying the resulting product that includes the first and second catalyst components, and recovering a supported bimetallic catalyst composition. The present invention is not limited to any particular method of affixing the catalyst components to the support.

First Catalyst Component

As noted above, exemplary embodiments of the bimetallic catalyst composition useful in the supported, treated catalyst systems of the present invention may include a first catalyst component, which is, or may include, a non-metallocene compound. However, it is contemplated that for certain applications the first catalyst component may alternatively be a metallocene compound, or even one of the metallocene-type catalyst compounds identified below that is different in structure from the second catalyst component as described herein. In a particular embodiment, the first catalyst component is a Ziegler-Natta catalyst compound. Ziegler-Natta catalyst components are well known in the art and described by, for example, ZIEGLER CATALYSTS 363-386 (G. Fink, R. Mulhaupt and H. H. Brintzinger, eds., Springer-Verlag 1995). Examples of such catalysts include those comprising $TiCl_4$ and other such transition metal oxides and chlorides.

The first catalyst component is combined with a support material, in one exemplary embodiment, either with, or without, the second catalyst component. The first catalyst component can be combined with, placed on, or otherwise affixed to a support in a variety of ways. In one of those ways, a slurry of the support in a suitable non-polar hydrocarbon diluent is contacted with an organomagnesium compound, which then dissolves in the non-polar hydrocarbon diluent of the slurry to form a solution from which the organomagnesium compound is then deposited onto the carrier. The organomagnesium compound can be represented by the formula RMgR', where R' and R are the same or different $C_2$-$C_{12}$ alkyl groups, or $C_4$-$C_{10}$ alkyl groups, or $C_4$-$C_8$ alkyl groups. In one exemplary embodiment, the organomagnesium compound is dibutyl magnesium. In one exemplary embodiment, the amount of organomagnesium compound included in the silica slurry is essentially only that which will be deposited, physically or chemically, onto the support (for example, being bound to the hydroxyl groups on the support) and essentially no more than that amount, as any excess organomagnesium compound may cause undesirable side reactions. Routine experimentation can be used to determine the optimum amount of organomagnesium compound. For example, the organomagnesium compound can be added to the slurry while stirring the slurry, until the organomagnesium compound is detected in the support solvent. Alternatively, the organomagnesium compound can be added in excess of the amount that is deposited onto the support, in which case any undeposited excess amount can be removed by filtration and washing. The amount of organomagnesium compound (moles) based on the amount of dehydrated silica (grams) generally ranges from 0.2 mmol/gram to 2 mmol/gram, in one exemplary embodiment.

Optionally, the organomagnesium compound-treated slurry may be contacted with an electron donor, such as tetraethylorthosiloxane (TEOS) or an organic alcohol R"OH, where R" is a $C_1$-$C_{12}$ alkyl group, or a $C_1$ to $C_8$ alkyl group, or a $C_2$ to $C_4$ alkyl group. In a particular embodiment, R"OH is n-butanol. The amount of alcohol used may be an amount effective to provide an R"OH:Mg mol/mol ratio of from 0.2 to 1.5, or from 0.4 to 1.2, or from 0.6 to 1.1, or from 0.9 to 1.0.

In an exemplary embodiment, the organomagnesium-and-alcohol-treated slurry is contacted with a non-metallocene transition metal compound. Suitable non-metallocene transition metal compounds are, for example, compounds of Group 4 and 5 metals that are soluble in the non-polar hydrocarbon used to form the silica slurry. Suitable non-metallocene transition metal compounds include, for example, titanium and vanadium halides, oxyhalides or alkoxyhalides, such as titanium tetrachloride ($TiCl_4$), vanadium tetrachloride ($VCl_4$) and vanadium oxytrichloride ($VOCl_3$), and titanium and vanadium alkoxides, wherein the alkoxide moiety has a branched or unbranched alkyl group of 1 to 20 carbon atoms, preferably 1 to 6 carbon atoms. Mixtures of such transition metal compounds also may be used. The amount of non-metallocene transition metal compound used is sufficient to give a molar ratio of transition metal to magnesium of from 0.3 to 1.5, or from 0.5 to 0.8 in a particular exemplary embodiment. The diluent can then be removed in a conventional manner, such as by evaporation or filtering, to obtain the dry, supported first catalyst component.

The first and second catalyst components may be contacted with the support in any order. In a particular exemplary embodiment of the invention, the first catalyst component is reacted first with the support as described above, then this supported first catalyst component is contacted with a second catalyst component.

Second Catalyst Component

As referred to herein, the term "second catalyst component" will be understood to refer to any catalyst component that is different from a first catalyst component. In an exemplary embodiment, the second catalyst component is a metallocene catalyst component.

Metallocene catalyst compounds are generally described throughout in 1 & 2 METALLOCENE-BASED POLYOLEFINS (John Scheirs & W. Kaminsky eds., John Wiley & Sons, Ltd. 2000); G. G. Hlalky in 181 COORDINATION CHEM. REV. 243-296 (1999) and in particular, for use in the synthesis of polyethylene, in 1 METALLOCENE-BASED POLYOLEFINS 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one Group 3 to Group 12 metal atom. Hereinafter, these compounds will be referred to as "metallocenes" or "metallocene catalyst components." The metallocene catalyst component is supported on a support material, in a particular embodiment that is described further below, and may be supported with, or without, the first catalyst component. In a particular exemplary embodiment, the metallocene catalyst component is supported with the first catalyst component.

The Cp ligands are typically α-bonded and/or fused ring(s) or ring systems. The ring(s) or ring system(s) typically comprise atoms selected from the group consisting of Groups 13 to 16 atoms, and in a particular exemplary embodiment, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. In a more particular exemplary embodiment, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthrenyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1, 2-9]anthrene, thiophenoindenyl, thiophenofluorenyl, hydrogenated versions thereof (e.g., 4,5,6,7-tetrahydroindenyl, or "H$_4$Ind"), substituted versions thereof, and heterocyclic versions thereof. In a particular exemplary embodiment, the metallocenes useful in the present invention are selected from those including one or two (two in a more particular exemplary embodiment) of the same or different Cp rings selected from the group consisting of cyclopentadienyl, indenyl, fluorenyl, tetrahydroindenyl, and substituted versions thereof.

The metal atom "M" of the metallocene catalyst compound may be selected from the group consisting of Groups 3 through 12 atoms and lanthanide Group atoms in one exemplary embodiment; and selected from the group consisting of Groups 3 through 10 atoms in a more particular exemplary embodiment; and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5 and 6 atoms in yet a more particular embodiment, and Ti, Zr, Hf atoms in yet a more particular embodiment, and Zr in still a more particular embodiment. The oxidation state of the metal atom "M" may range from 0 to +7 in one exemplary embodiment; and, in a more particular exemplary embodiment, may be +1, +2, +3, +4 or +5; and in yet a more particular embodiment may be +2, +3 or +4. The groups bound to the metal atom "M" are such that the compounds described below in the formulas and structures are electrically neutral, unless otherwise indicated. The Cp ligand(s) form at least one chemical bond with the metal atom M to form the "metallocene catalyst compound." The Cp ligands are distinct from the leaving groups bound to the catalyst compound in that they are not highly susceptible to substitution/abstraction reactions.

In one exemplary embodiment, the supported bimetallic catalyst includes a metallocene catalyst component represented by the formula (I):

$$Cp^A Cp^B MX_n \qquad (I)$$

wherein M is as described above;
each X is chemically bonded to M;
each Cp group is chemically bonded to M;
and n is an integer from 0 to 4, and either 1 or 2 in a particular embodiment.

The ligands represented by $Cp^A$ and $Cp^B$ in formula (I) may be the same or different cyclopentadienyl ligands or ligands isolobal to cyclopentadienyl, either or both of which may contain heteroatoms, and either or both of which may be substituted by a group R. In one exemplary embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) as well as ring substituents in structures (Va-d) include substituent groups R selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituent groups R associated with formulae (I) through (V) include methyl, ethyl, propyl, butyl, pentyl, hexyl, cyclopentyl, cyclohexyl, benzyl, phenyl, methylphenyl, and tert-butylphenyl groups and the like, including all their isomers, such as, for example, tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)silyl, methylbis(difluoromethyl)silyl, bromomethyldimethylgermyl and the like; and disubstituted boron radicals, including dimethylboron, for example; and disubstituted Group 15 radicals including dimethylamine, dimethylphosphine, diphenylamine, methylphenylphosphine; and Group 16 radicals including methoxy, ethoxy, propoxy, phenoxy, methylsulfide and ethylsulfide. Other substituent groups R include olefins such as, but not limited to, olefinically unsaturated substituents including vinyl-terminated ligands, for example 3-butenyl, 2-propenyl, 5-hexenyl and the like. In one exemplary embodiment, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron and combinations thereof. Also, a substituent R group such as 1-butanyl may form a bonding association to the element M.

Each X in the formula (I) above, and for the formulae/ structures (II) through (Va-d) below, is independently selected from the group consisting of: any leaving group, in one exemplary embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment;

chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

Non-limiting examples of other X groups include alkyls, amines, phosphines, ethers, carboxylates, dienes, hydrocarbon radicals having from 1 to 20 carbon atoms; fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one exemplary embodiment, two or more X's form a part of a fused ring or ring system.

In another exemplary embodiment, the supported bimetallic catalyst includes a metallocene catalyst component such as those of formula (I) where $Cp^A$ and $Cp^B$ are bridged to each other by at least one bridging group, (A), such that the structure is represented by formula (II):

$$Cp^A(A)Cp^BMX_n \quad (II)$$

These bridged compounds represented by formula (II) are known as "bridged metallocenes." The elements $Cp^A$, $Cp^B$, M, X and n in structure (II) are as defined above for formula (I), each Cp ligand is chemically bonded to M, and (A) is chemically bonded to each Cp ligand. Non-limiting examples of bridging group (A) include divalent hydrocarbon groups containing at least one Group 13 to 16 atom, such as, but not limited to, at least one of a carbon, oxygen, nitrogen, silicon, aluminum, boron, germanium and tin atom, and combinations thereof, wherein the heteroatom may also be $C_1$ to $C_{12}$ alkyl- or aryl-substituted to satisfy neutral valency. The bridging group (A) may also contain substituent groups R as defined above (for formula (I)), including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, —$Si(R')_2$ $Si(R'_2)$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one exemplary embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis (trifluoromethyl)silyl, di(n-butyl)silyl, di(n-propyl)silyl, di(1-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another exemplary embodiment, bridging group (A) may also be cyclic, comprising, for example, 4 to 10 ring members; in a more particular exemplary embodiment, bridging group (A) may comprise 5 to 7 ring members. The ring members may be selected from the elements mentioned above, and, in a particular exemplary embodiment, are selected from one or more of B, C, Si, Ge, N and O. Non-limiting examples of ring structures which may be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in a particular exemplary embodiment, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are, in one exemplary embodiment, selected from the group consisting of hydrocarbyl (e.g., alkyl such as methyl) and halogen (e.g., F, Cl). The one or more Cp groups to which the above cyclic bridging moieties may optionally be fused may be saturated or unsaturated, and are selected from the group consisting of those having 4 to 10 ring members, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formulae (I) and (II) are different from each other in one exemplary embodiment, and the same in another exemplary embodiment.

In yet another exemplary embodiment, the supported bimetallic catalyst includes bridged mono-ligand metallocene compounds (e.g., mono cyclopentadienyl catalyst components). In this embodiment, the metallocene catalyst component is a bridged "half-sandwich" metallocene represented by the formula (III):

$$Cp^A(A)QMX_r \quad (III)$$

wherein
$Cp^A$ is defined above and is bound to M;
(A) is a bridging group bonded to Q and $Cp^A$;
an atom from the Q group is bonded to M; and
r is an integer 0, 1 or 2.

In formula (III) above, $Cp^A$, (A) and Q may form a fused ring system. The X groups of formula (III) are as defined above in formula (I) and (II). In one exemplary embodiment, $Cp^A$ is selected from the group consisting of cyclopentadienyl, indenyl, tetrahydroindenyl, fluorenyl, substituted versions thereof, and combinations thereof.

In formula (III), Q is a heteroatom-containing ligand in which the bonding atom (the atom that is bonded with the metal M) is, in one exemplary embodiment, selected from the group consisting of Group 15 atoms and Group 16 atoms. In yet a more particular embodiment, the bonding atom is selected from the group consisting of nitrogen, phosphorus, oxygen or sulfur atom. In still a more particular embodiment, the bonding atom is selected from the group consisting of nitrogen and oxygen. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds having Group 15 and Group 16 atoms capable of bonding with M.

In yet another exemplary embodiment, the supported bimetallic catalyst includes a component that is an unbridged "half sandwich" metallocene represented by the formula (IVa):

$$Cp^A MQ_q X_w \qquad \text{(IVa)}$$

wherein
- $Cp^A$ is defined as for the Cp groups in (I) and is a ligand that is bonded to M;
- each Q is independently bonded to M;
- X is a leaving group as described above in (I);
- w ranges from 0 to 3, and is 0 or 3 in one exemplary embodiment; and
- q ranges from 0 to 3, and is 0 or 3 in one exemplary embodiment.

In one exemplary embodiment, $Cp^A$ is selected from the group consisting of cyclopentadienyl, indenyl, tetrahydroindenyl, fluorenyl, substituted version thereof, and combinations thereof.

In formula (IVa), Q is selected from the group consisting of $ROO^-$, $RO$—, $R(O)$—, $-NR$—, $-CR_2$—, $-S$—, $-NR_2$, $-CR_3$, $-SR$, $-SiR_3$, $-PR_2$, $-H$, and substituted and unsubstituted aryl groups, R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ alkyls, and $C_2$ to $C_{20}$ heteroallyl moieties.

Described another way, the "half sandwich" metallocenes above can be described as in formula (IVb), such as described in, for example, U.S. Pat. No. 6,069,213:

$$Cp^A M(W_2 GZ) X_y \text{ or}$$

$$T(Cp^A M(W_2 GZ) X_y)_m \qquad \text{(IVb)}$$

wherein M, $Cp^A$, and X are as defined above;
$W_2 GZ$ forms a polydentate ligand unit (e.g., pivalate), wherein at least one of the W groups form a bond with M, and is defined such that each W is independently selected from the group consisting of $-O$—, $-NR$—, $-CR_2$— and $-S$—; G is either carbon or silicon; and Z is selected from the group consisting of R, $-OR$, $-NR_2$, $-CR_3$, $-SR$, $-SiR_3$, $-PR_2$, and hydride, providing that when W is $-NR$—, then Z is selected from the group consisting of $-OR$, $-NR_2$, $-SR$, $-SiR_3$, $-PR_2$; and provided that neutral valency for W is satisfied by Z; and wherein each R is independently selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;
y is 1 or 2 in a particular embodiment;
T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^A M(W_2 GZ) X_y$" groups, and is chemically bonded to the $Cp^A$ groups; and
m is an integer from 1 to 7. In an exemplary embodiment, m is an integer from 2 to 6.

In another aspect of the invention, the supported bimetallic catalyst includes a metallocene catalyst component that can be described more particularly in structures (Va), (Vb), (Vc) and (Vd):

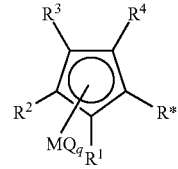
(Va-i)

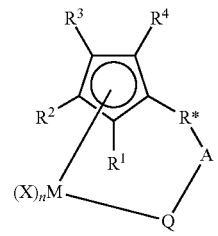
(Va-ii)

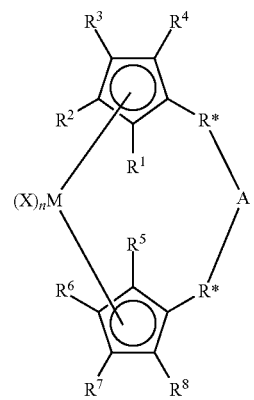
(Vb)

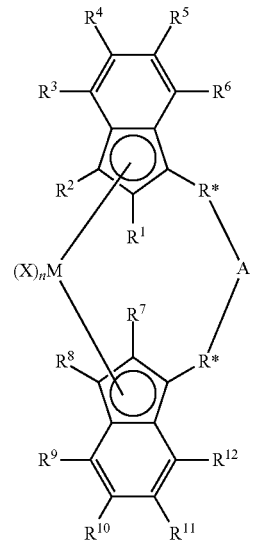
(Vc)

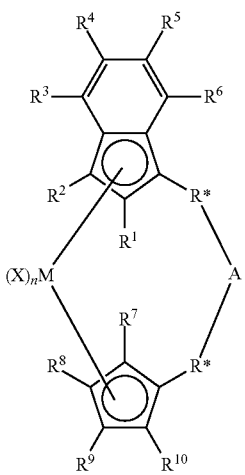
(Vd)

wherein in structures (Va) to (Vd) M is selected from the group consisting of Group 3 to Group 12 atoms, and selected from the group consisting of Group 3 to Group 10 atoms in a more particular embodiment, and selected from the group consisting of Group 3 to Group 6 atoms in yet a more particular embodiment, and selected from the group consisting of Group 4 atoms in yet a more particular embodiment, and selected from the group consisting of Zr and Hf in yet a more particular embodiment; and is Zr in yet a more particular embodiment;

wherein Q in (Va-i) and (Va-ii) is selected from the group consisting of halogen ions, alkyls, alkylenes, aryls, arylenes, alkoxys, aryloxys, amines, alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include triethylacetate, trimethylacetate, methylacetate, p-toluate, benzoate, diethylcarbamate, and dimethylcarbamate), fluorinated alkyls, fluorinated aryls, and fluorinated alkylcarboxylates;

q is an integer ranging from 1 to 3;

wherein each R* is independently selected from the group consisting of hydrocarbyls and heteroatom-containing hydrocarbyls in one exemplary embodiment; and selected from the group consisting of alkylenes, substituted alkylenes and heteroatom-containing hydrocarbyls in another exemplary embodiment; and independently selected from the group consisting of $C_1$ to $C_{12}$ alkylenes, $C_1$ to $C_{12}$ substituted alkylenes, and $C_1$ to $C_{12}$ heteroatom-containing hydrocarbons in a more particular embodiment; and independently selected from the group consisting of $C_1$ to $C_4$ alkylenes in yet a more particular embodiment; and wherein both R* groups are identical in another exemplary embodiment in structures (Vb-d);

A is as described above for (A) in structure (II), and more particularly, selected from the group consisting of —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one exemplary embodiment; and selected from the group consisting of $C_5$ to $C_8$ cyclic hydrocarbons, —CH$_2$CH$_2$—, =CR$_2$ and =SiR$_2$ in a more particular embodiment; wherein and R is selected from the group consisting of alkyls, cycloalkyls, aryls, alkoxys, fluoroalkyls and heteroatom-containing hydrocarbons in one exemplary embodiment; and R is selected from the group consisting of $C_1$ to $C_6$ alkyls, substituted phenyls, phenyl, and $C_1$ to $C_6$ alkoxys in a more particular embodiment; and R is selected from the group consisting of methoxy, methyl, phenoxy, and phenyl in yet a more particular embodiment;

wherein A may be absent in yet another exemplary embodiment, in which case each R* is defined as for $R^1$-$R^{12}$;

each X is as described above in (I);

n is an integer from 0 to 4, and from 1 to 3 in another exemplary embodiment, and 1 or 2 in yet another exemplary embodiment; and $R^1$ through $R^{12}$ are independently selected from the group consisting of hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof, in one exemplary embodiment; independently selected from the group consisting of hydrogen radical, fluorine radical, chlorine radical, bromine radical, $C_1$ to $C_6$ alkyls, $C_2$ to $C_6$ alkenyls, $C_7$ to $C_{15}$ alkylaryls, $C_1$ to $C_6$ fluoroalkyls, $C_2$ to $C_6$ fluoroalkenyls, $C_7$ to $C_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-di-methylphenyl, and 4-tertiarybutylphenyl groups in yet a more particular embodiment; wherein adjacent R groups may form a ring, either saturated, partially saturated, or completely saturated.

The structure of the metallocene catalyst component represented by (Va) may take on many forms, such as those disclosed in, for example, U.S. Pat. No. 5,026,798, U.S. Pat. No. 5,703,187, and U.S. Pat. No. 5,747,406, including a dimer or oligomeric structure, such as disclosed in, for example, U.S. Pat. No. 5,026,798 and U.S. Pat. No. 6,069,213.

In a particular embodiment of the metallocene represented in (Vd), $R^1$ and $R^2$ form a conjugated 6-membered carbon ring system that may or may not be substituted.

Non-limiting examples of metallocene catalyst components consistent with the description herein include:
cyclopentadienylzirconium $X_n$,
indenylzirconium $X_n$,
(1-methylindenyl)zirconium $X_n$,
(2-methylindenyl)zirconium $X_n$,
(1-propylindenyl)zirconium $X_n$,
(2-propylindenyl)zirconium $X_n$,
(1-butylindenyl)zirconium $X_n$,
(2-butylindenyl)zirconium $X_n$,
(methylcyclopentadienyl)zirconium $X_n$,
tetrahydroindenylzirconium $X_n$,
(pentamethylcyclopentadienyl)zirconium $X_n$,
cyclopentadienylzirconium $X_n$,
pentamethylcyclopentadienyltitanium $X_n$,
tetramethylcyclopentyltitanium $X_n$,
1,2,4-trimethylcyclopentadienylzirconium $X_n$,
dimethylsilyl(1,2,3,4-tetramethylcyclopentadienyl)(cyclopentadienyl)zirconium $X_n$,
dimethylsilyl(1,2,3,4-tetramethylcyclopentadienyl)(1,2,3-trimethyl-cyclopentadienyl)zirconium $X_n$,
dimethylsilyl(1,2,3,4-tetramethylcyclopentadienyl)(1,2-dimethyl-cyclopentadienyl)zirconium $X_n$,
dimethylsilyl(1,2,3,4-tetramethyl-cyclopentadienyl)(2-methylcyclopentadienyl)zirconium $X_n$,
dimethylsilyl(cyclopentadienyl)(indenyl)zirconium $X_n$, dimethylsilyl(2-methylindenyl)(fluorenyl)zirconium $X_n$,
diphenylsilyl(1,2,3,4-tetramethyl-cyclopentadienyl)(3-propylcyclopentadienyl)zirconium $X_n$,
dimethylsilyl (1,2,3,4-tetramethylcyclopentadienyl)(3-t-butylcyclopentadienyl)zirconium $X_n$,
dimethylgermyl(1,2-dimethylcyclopentadienyl)(3-isopropylcyclopentadienyl)zirconium $X_n$,
dimethylsilyl(1,2,3,4-tetramethyl-cyclopentadienyl)(3-methylcyclopentadienyl)zirconium $X_n$,
diphenylmethylidene(cyclopentadienyl)(9-fluorenyl)zirconium $X_n$,
diphenylmethylidene(cyclopentadienyl)(indenyl)zirconium $X_n$,
iso-propylidenebis(cyclopentadienyl)zirconium $X_n$,
iso-propylidene(cyclopentadienyl)(9-fluorenyl)zirconium $X_n$,
iso-propylidene(3-methylcyclopentadienyl)(9-fluorenyl)zirconium $X_n$,
ethylenebis(9-fluorenyl)zirconium $X_n$,
meso-ethylenebis(1-indenyl)zirconium $X_n$,
ethylenebis(1-indenyl)zirconium $X_n$,
ethylenebis(2-methyl-1-indenyl)zirconium $X_n$,
ethylenebis(2-methyl-4,5,6,7-tetrahydro-1-indenyl)zirconium $X_n$,
ethylenebis(2-propyl-4,5,6,7-tetrahydro-1-indenyl)zirconium $X_n$,
ethylenebis(2-isopropyl-4,5,6,7-tetrahydro-1-indenyl)zirconium $X_n$,
ethylenebis(2-butyl-4,5,6,7-tetrahydro-1-indenyl)zirconium $X_n$,
ethylenebis(2-isobutyl-4,5,6,7-tetrahydro-1-indenyl)zirconium $X_n$,
dimethylsilyl(4,5,6,7-tetrahydro-1-indenyl)zirconium $X_n$,
diphenyl(4,5,6,7-tetrahydro-1-indenyl)zirconium $X_n$,
ethylenebis(4,5,6,7-tetrahydro-1-indenyl)zirconium $X_n$,
dimethylsilylbis(cyclopentadienyl)zirconium $X_n$,
dimethylsilylbis(9-fluorenyl)zirconium $X_n$,
dimethylsilylbis(1-indenyl)zirconium $X_n$,
dimethylsilylbis(2-methylindenyl)zirconium $X_n$,
dimethylsilylbis(2-propylindenyl)zirconium $X_n$,
dimethylsilylbis(2-butylindenyl)zirconium $X_n$,
diphenylsilylbis(2-methylindenyl)zirconium $X_n$,
diphenylsilylbis(2-propylindenyl)zirconium $X_n$,
diphenylsilylbis(2-butylindenyl)zirconium $X_n$,
dimethylgermylbis(2-methylindenyl)zirconium $X_n$,
dimethylsilylbis(tetrahydroindenyl)zirconium $X_n$,
dimethylsilylbis(tetramethylcyclopentadienyl)zirconium $X_n$,
dimethylsilyl(cyclopentadienyl)(9-fluorenyl)zirconium $X_n$,
diphenylsilyl(cyclopentadienyl)(9-fluorenyl)zirconium $X_n$,
diphenylsilylbis(indenyl)zirconium $X_n$,
cyclotrimethylenesilyl(tetramethylcyclopentadienyl)(cyclopentadienyl)zirconium $X_n$,
cyclotetramethylenesilyl(tetramethylcyclopentadienyl)(cyclopentadienyl)zirconium $X_n$,
cyclotrimethylenesilyl(tetramethylcyclopentadienyl)(2-methylindenyl)zirconium $X_n$,
cyclotrimethylenesilyl(tetramethylcyclopentadienyl)(3-methylcyclopentadienyl)zirconium $X_n$,
cyclotrimethylenesilylbis(2-methylindenyl)zirconium $X_n$,
cyclotrimethylenesilyl(tetramethylcyclopentadienyl)(2,3,5-trimethylcyclopentadienyl)zirconium $X_n$,
cyclotrimethylenesilylbis(tetramethylcyclopentadienyl)zirconium $X_n$, dimethylsilyl(tetramethylcyclopentadienyl)(N-tert-butylamido)titanium $X_n$,
bis(cyclopentadienyl)chromium $X_n$, bis(cyclopentadienyl)zirconium $X_n$,
bis(n-butylcyclopentadienyl)zirconium $X_n$,
bis(n-dodecyclcyclopentadienyl)zirconium $X_n$,
bis(ethylcyclopentadienyl)zirconium $X_n$,
bis(iso-butylcyclopentadienyl)zirconium $X_n$,
bis(iso-propylcyclopentadienyl)zirconium $X_n$,
bis(methylcyclopentadienyl)zirconium $X_n$,
bis(n-oxtylcyclopentadienyl)zirconium $X_n$,
bis(n-pentylcyclopentadienyl)zirconium $X_n$,
bis(n-propylcyclopentadienyl)zirconium $X_n$,
bis(trimethylsilylcyclopentadienyl)zirconium $X_n$,
bis(1,3-bis(trimethylsilyl)cyclopentadienyl)zirconium $X_n$,
bis(1-ethyl-2-methylcyclopentadienyl)zirconium $X_n$,
bis(1-ethyl-3-methylcyclopentadienyl)zirconium $X_n$,
bis(pentamethylcyclopentadienyl)zirconium $X_n$,
bis(pentamethylcyclopentadienyl)zirconium $X_n$,
bis(1-propyl-3-methylcyclopentadienyl)zirconium $X_n$,
bis(1-n-butyl-3-methylcyclopentadienyl)zirconium $X_n$,
bis(1-isobutyl-3-methylcyclopentadienyl)zirconium $X_n$,
bis(1-propyl-3-butylcyclopentadienyl)zirconium $X_n$,
bis(1,3-n-butylcyclopentadienyl)zirconium $X_n$,
bis(4,7-dimethylindenyl)zirconium $X_n$,
bis(indenyl)zirconium $X_n$,
bis(2-methylindenyl)zirconium $X_n$,
cyclopentadienylindenylzirconium $X_n$,
(tetramethylcyclopentadienyl)(n-propylcyclopentadienyl) zirconium $X_n$,
(pentamethylcyclopentadienyl)(n-propylcyclopentadienyl) zirconium $X_n$,
bis(n-propylcyclopentadienyl)hafnium $X_n$,
bis(n-butylcyclopentadienyl)hafnium $X_n$,
bis(n-pentylcyclopentadienyl)hafnium $X_n$,
(n-propyl cyclopentadienyl)(n-butyl cyclopentadienyl) hafnium $X_n$,
bis[(2-trimethylsilylethyl)cyclopentadienyl]hafnium $X_n$,
bis(trimethylsilyl cyclopentadienyl)hafnium $X_n$,
bis(2-n-propylindenyl)hafnium $X_n$,
bis(2-n-butylindenyl)hafnium $X_n$,
dimethylsilylbis(n-propylcyclopentadienyl)hafnium $X_n$,
dimethylsilylbis(n-butylcyclopentadienyl)hafnium $X_n$,
bis(9-n-propylfluorenyl)hafnium $X_n$,
bis(9-n-butylfluorenyl)hafnium $X_n$,
(9-n-propylfluorenyl)(2-n-propylindenyl)hafnium $X_n$,
bis(1-n-propyl-2-methylcyclopentadienyl)hafnium $X_n$,
(n-propylcyclopentadienyl)(1-n-propyl-3-n-butylcyclopentadienyl)hafnium $X_n$,
dimethylsilyl(tetramethylcyclopentadienyl)(cyclopropylamido)titanium $X_n$,
dimethylsilyl(tetramethyleyclopentadienyl)(cyclobutylamido)titanium $X_n$,
dimethylsilyl(tetramethyleyclopentadienyl)(cyclopentylamido)titanium $X_n$,
dimethylsilyl(tetramethylcyclopentadienyl)(cyclohexylamido)titanium $X_n$,
dimethylsilyl(tetramethylcyclopentadienyl)(cycloheptylamido)titanium $X_n$,
dimethylsilyl(tetramethylcyclopentadienyl)(cyclooctylamido)titanium $X_n$,
dimethylsilyl(tetramethylcyclopentadienyl)(cyclononylamido)titanium $X_n$,
dimethylsilyl(tetramethylcyclopentadienyl)(cyclodecylamido)titanium $X_n$,
dimethylsilyl(tetramethylcyclopentadienyl)(cycloundecylamido)titanium $X_n$,
dimethylsilyl(tetramethylcyclopentadienyl)(cyclododecylamido)titanium $X_n$,
dimethylsilyl(tetramethylcyclopentadienyl)(sec-butylamido)titanium $X_n$, dimethylsilyl(tetramethylcyclopentadienyl)(n-octylamido)titanium $X_n$,
dimethylsilyl(tetramethylcyclopentadienyl)(n-decylamido)titanium $X_n$,
dimethylsilyl(tetramethylcyclopentadienyl)(n-octadecylamido)titanium $X_n$,
methylphenylsilyl(tetramethylcyclopentadienyl)(cyclopropylamido)titanium $X_n$,
methylphenylsilyl(tetramethylcyclopentadienyl)(cyclobutylamido)titanium $X_n$,
methylphenylsilyl(tetramethylcyclopentadienyl)(cyclopentylamido)titanium $X_n$,
methylphenylsilyl(tetramethylcyclopentadienyl)(cyclohexylamido)titanium $X_n$,
methylphenylsilyl(tetramethylcyclopentadienyl)(cycloheptylamido)titanium $X_n$,
methylphenylsilyl(tetramethylcyclopentadienyl)(cyclooctylamido)titanium $X_n$,
methylphenylsilyl(tetramethylcyclopentadienyl)(cyclononylamido)titanium $X_n$,
methylphenylsilyl(tetramethylcyclopentadienyl)(cyclodecylamido)titanium, $X_n$,
methylphenylsilyl(tetramethylcyclopentadienyl)(cycloundecylamido)titanium $X_n$,
methylphenylsilyl(tetramethylcyclopentadienyl)(cyclododecylamido)titanium $X_n$,
methylphenylsilyl(tetramethylcyclopentadienyl)(sec-butylamido)titanium $X_n$,
methylphenylsilyl(tetramethylcyclopentadienyl)(n-octylamido)titanium $X_n$,
methylphenylsilyl(tetramethylcyclopentadienyl)(n-decylamido)titanium $X_n$,
methylphenylsilyl(tetramethylcyclopentadienyl)(n-octadecylamido)titanium $X_n$,
diphenylsilyl(tetramethylcyclopentadienyl)(cyclopropylamido)titanium $X_n$,
diphenylsilyl(tetramethylcyclopentadienyl)(cyclobutylamido)titanium $X_n$,
diphenylsilyl(tetramethylcyclopentadienyl)(cyclopentylamido)titanium $X_n$,
diphenylsilyl(tetramethylcyclopentadienyl)(cyclohexylamido)titanium $X_n$,
diphenylsilyl(tetramethylcyclopentadienyl)(cycloheptylamido)titanium $X_n$,
diphenylsilyl(tetramethylcyclopentadienyl)(cyclooctylamido)titanium $X_n$,
diphenylsilyl(tetramethylcyclopentadienyl)(cyclononylamido)titanium $X_n$,
diphenylsilyl(tetramethylcyclopentadienyl)(cyclodecylamido)titanium $X_n$,
diphenylsilyl(tetramethylcyclopentadienyl)(cycloundecylamido)titanium $X_n$,
diphenylsilyl(tetramethylcyclopentadienyl)(cyclododecylamido)titanium $X_n$,
diphenylsilyl(tetramethylcyclopentadienyl)(sec-butylamido)titanium $X_n$,
diphenylsilyl(tetramethyleyclopentadienyl)(n-octylamido)titanium $X_n$,
diphenylsilyl(tetramethyleyclopentadienyl)(n-decylamido)titanium $X_n$,
diphenylsilyl(tetramethylcyclopentadienyl)(n-octadecylamido)titanium $X_n$, and derivatives thereof,
wherein the value of n is 1, 2 or 3. The phrase "derivatives thereof" will be understood to mean any substitution or ring formation as described above for structures (Va-d) in one exemplary embodiment; and in particular, replacement of the metal "M" (Cr, Zr, Ti or Hf) with an atom selected from the group consisting of Cr, Zr, Hf and Ti; and replacement of the "X" group with any of $C_1$ to $C_5$ alkyls, $C_6$ aryls, $C_6$ to $C_{10}$ alkylaryls, fluorine, chlorine, or bromine.

It is contemplated that the metallocene catalysts components described above include their structural or optical or enantiomeric isomers (racemic mixture), and, in one exemplary embodiment, may be a pure enantiomer.

As used herein, a single, bridged, asymmetrically substituted metallocene catalyst component having a racemic and/or meso isomer does not, itself, constitute at least two different bridged, metallocene catalyst components.

The "metallocene catalyst component" useful in the present invention may comprise any combination of any "embodiment" described herein.

When combined to form the bimetallic catalyst component, the molar ratio of metal from the first catalyst component to the second catalyst component (e.g., molar ratio of Ti:Zr) is a value of from 0.1:1 to 20:1 in one exemplary embodiment; and from 1:1 to 18:1 in another exemplary embodiment, and from 2:1 to 15:1 in yet another exemplary embodiment; and from 3:1 to 12:1 in yet another exemplary embodiment; and from 4:1 to 10:1 in yet another exemplary embodiment, and from 4:1 to 8:1 in yet another exemplary embodiment; wherein a desirable molar ratio of first catalyst component metal:second catalyst component metal is any combination of any upper limit with any lower limit described herein.

MAO-Activatable Compound

A "supported, treated catalyst system" comprises a bimetallic catalyst system that has been contacted with at least one compound that can be activated by methylalumoxane ("MAO-activatable compound"). Because the MAO-activatable compounds used with the present invention generally include transition metals, the supported, treated catalyst systems of the present invention generally have greater concentrations of transition metals (which can be activated by MAO) than do bimetallic catalyst systems. For example, in one embodiment, the supported, treated catalyst systems of the present invention have a transition metal concentration that is up to 25% greater than that of a typical bimetallic catalyst system; in another exemplary embodiment, the supported, treated catalyst systems of the present invention have a transition metal concentration that is more than 25% greater than that of a typical bimetallic catalyst system. Accordingly, the supported, treated catalyst systems of the present invention generally demonstrate more efficient use of MAO when they are used in polymerization processes than do typical bimetallic catalyst systems.

In an exemplary embodiment of the present invention, the at least one MAO-activatable compound is a metallocene catalyst compound, non-limiting examples of which have been previously described. In another exemplary embodiment, the at least one MAO-activatable compound is a Group-15-component-containing compound; a phenoxide catalyst compound; an additionally-discovered catalyst compound; or a conventional transition metal catalyst compound.

Group-15-Component-Containing Catalyst Compound

The at least one MAO-activatable compound may include one or more Group-15-component-containing catalyst compounds. The Group-15-component-containing compound generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

In one embodiment, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

In another embodiment, the Group-15-component-containing compound of the present invention may be represented by the formulae:

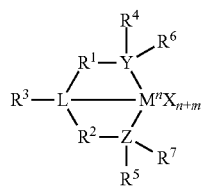

Formula VI or

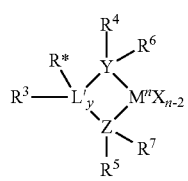

Formula VII wherein M is a Group 3 to 12 transition metal or a Group 13 or 14 main group metal, preferably a Group 4, 5, or 6 metal, and more preferably a Group 4 metal, and most preferably zirconium, titanium or hafnium, each X is independently a leaving group, preferably, an anionic leaving group, and more preferably hydrogen, a hydrocarbyl group, a heteroatom or a halogen, and most preferably an alkyl;

y is 0 or 1 (when y is 0, group L' is absent), n is the oxidation state of M, preferably +3, +4, or +5, and more preferably +4, m is the formal charge of the YZL or the YZL' ligand, preferably 0, −1, −2 or −3, and more preferably −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, halogen or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ may also be interconnected to each other.

$R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen, $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR^3$, where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and $R^*$ is absent, or is hydrogen, a Group 14 atom containing group, a halogen, or a heteroatom containing group.

The term "formal charge of the YZL or YZL' ligand," refers to the charge of the entire ligand absent the metal and the leaving groups X. The term "$R^1$ and $R^2$ may also be interconnected" means that $R^1$ and $R^2$ may be directly bound to each other or may be bound to each other through other groups. The term "$R^4$ and $R^5$ may also be interconnected" means that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In an exemplary embodiment, $R^4$ and $R^5$ are independently a group represented by the following formula:

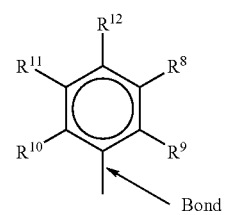

Formula VIII

Bond to Z or Y wherein:

$R^1$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In a particular exemplary embodiment, $R^4$ and $R^5$ are both a group represented by the following formula:

Formula IX

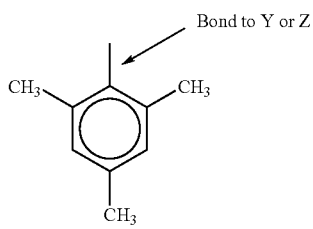

In this embodiment, M is a Group 4 metal, preferably zirconium, titanium or hafnium, and even more preferably zirconium; each of L, Y, and Z is nitrogen; each of $R^1$ and $R^2$ is —CH 2-CH 2-; $R^3$ is hydrogen; and $R^6$ and $R^7$ are absent.

In a particular exemplary embodiment, the Group-15-component-containing compound is represented by Compound 1 below:

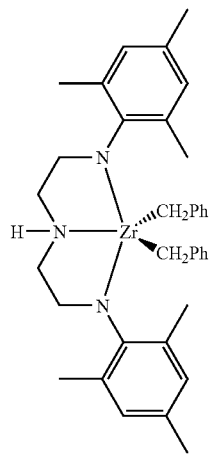

wherein "Ph" represents a phenyl group.

In exemplary embodiments of the present invention where the at least one MAO-activatable compound includes a Group-15-component-containing compound, the Group-15-component-containing compound may be prepared by methods known in the art, such as those disclosed in EP 0 893 454 A1, U.S. Pat. No. 5,889,128 and the references cited in U.S. Pat. No. 5,889,128. U.S. patent application Ser. No. 09/312,878, filed May 17, 1999, now U.S. Pat. No. 6,271,325, discloses a gas or slurry phase polymerization process using a supported bisamide catalyst.

A preferred direct synthesis of these compounds comprises reacting the neutral ligand, (see for example YZL or YZL' of formula VI or VII) with $M''X_n$ (M is a Group 3 to 14 metal, n is the oxidation state of M, each X is an anionic group, such as halide), in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

In one embodiment the Group-15-component-containing compound is prepared by a method comprising reacting a neutral ligand, (see for example YZL or YZL' of formula VI or VII) with a compound represented by the formula $M''X_n$ (where M is a Group 3 to 14 metal, n is the oxidation state of M, each X is an anionic leaving group) in a non-coordinating or weakly coordinating solvent, at about 20° C. or above, preferably at about 20 to about 100° C., then treating the mixture with an excess of an alkylating agent, then recovering the metal complex. In a preferred embodiment the solvent has a boiling point above 60° C., such as toluene, xylene, benzene, and/or hexane. In another embodiment the solvent comprises ether and/or methylene chloride, either being preferable.

Additional information pertaining to Group-15-component-containing compounds may be found in, inter alia, EP 0 893 454 A1, which discloses transition metal amides combined with activators to polymerize olefins.

In one embodiment the Group-15-component-containing compound is allowed to age prior to use in a polymerization. It has been noted on at least one occasion that one such catalyst compound (aged at least 48 hours) performed better than a newly prepared catalyst compound.

Phenoxide Catalyst Compound

The at least one MAO-activatable compound may include one or more phenoxide catalyst compounds represented by the following formulae:

Formula X

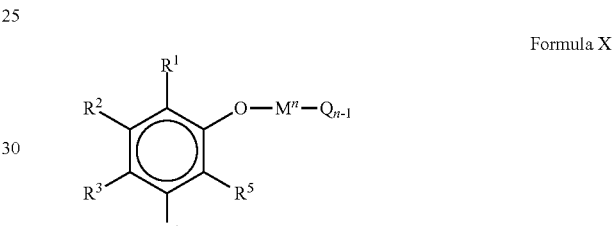

Formula XI

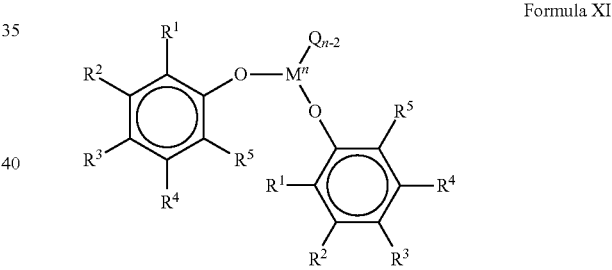

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M, and at least one of $R^2$ to $R^5$ is a group containing a heteroatom, the rest of $R^2$ to $R^5$ are independently hydrogen or a $C_1$ to $C_{100}$ group, preferably a $C_4$ to $C_{20}$ alkyl group (preferably butyl, isobutyl, pentyl hexyl, heptyl, isohexyl, octyl, isooctyl, decyl, nonyl, dodecyl) and any of $R^2$ to $R^5$ also may or may not be bound to M, O is oxygen, M is a group 3 to group 10 transition metal or lanthanide metal, preferably a group 4 metal, preferably Ti, Zr or Hf, n is the valence state of the metal M, preferably 2, 3, 4, or 5, Q is an alkyl, halogen, benzyl, amide, carboxylate, carbamate, thiolate, hydride or alkoxide group, and may be bound to an R group containing a heteroatom, which may be any of $R^1$ to $R^5$. A heteroatom containing group may be any heteroatom or a heteroatom bound to carbon silica or another heteroatom. Preferred heteroatoms include boron, aluminum, silicon, nitrogen, phosphorus, arsenic, tin, lead, antimony, oxygen, selenium, tellurium. Particularly preferred heteroatoms include nitrogen, oxygen, phosphorus, and sulfur. Even more particularly preferred heteroatoms include oxygen and nitrogen. The heteroatom itself may be directly bound to the phenoxide ring or it may be bound to another atom or atoms that are bound to the phenoxide ring. The heteroatom containing group may contain one or more of the same or different heteroatoms. Preferred heteroatom groups include imines, amines, oxides, phosphines, ethers, ketenes, oxoazolines heterocyclics, oxazolines, thioethers, and the like. Particularly preferred heteroatom groups include imines. Any two adjacent R groups may form a ring structure, preferably a 5 or 6 membered ring. Likewise, the R groups may form multi-ring structures. In one embodiment any two or more R groups do not form a 5 membered ring.

In an exemplary embodiment, Q is bound to any of $R^2$ to $R^5$ and the R group to which Q is bound is a heteroatom-containing group.

This invention may also be practiced with the catalysts disclosed in EP 0 874 005 A1.

In an exemplary embodiment, the phenoxide catalyst compound includes one or more of:
bis(N-methyl-3,5-di-t-butylsalicylimino)zirconium(IV) dibenzyl;
bis(N-ethyl-3,5-di-t-butylsalicylimino)zirconium(IV) dibenzyl;
bis(N-iso-propyl-3,5-di-t-butylsalicylimino)zirconium(IV) dibenzyl;
bis(N-t-butyl-3,5-di-t-butylsalicylimino)zirconium(IV) dibenzyl;
bis(N-benzyl-3,5-di-t-butylsalicylimino)zirconium(IV) dibenzyl;
bis(N-hexyl-3,5-di-t-butylsalicylimino)zirconium(IV) dibenzyl;
bis(N-phenyl-3,5-di-t-butylsalicylmino)zirconium(IV) dibenzyl;
bis(N-methyl-3,5-di-t-butylsalicylimino)zirconium(IV) dibenzyl;
bis(N-benzyl-3,5-di-t-butylsalicylimino)zirconium(IV) dichloride;
bis(N-benzyl-3,5-di-t-butylsalicylimino)zirconium(IV) dipivalate;
bis(N-benzyl-3,5-di-t-butylsalicylimino)titanium(IV) dipivalate;
bis(N-benzyl-3,5-di-t-butylsalicylimino)zirconium(IV) di(bis(dimethylamide));
bis(N-iso-propyl-3,5-di-t-amylsalicylimino)zirconium(IV) dibenzyl;
bis(N-iso-propyl-3,5-di-t-octylsalicylimino)zirconium(IV) dibenzyl;
bis(N-iso-propyl-3,5-di-(1',1'-dimethylbenzyl)salicylimino) zirconium(IV) dibenzyl;
bis(N-iso-propyl-3,5-di-(1',1'-dimethylbenzyl)salicylimino) titanium(IV) dibenzyl;
bis(N-iso-propyl-3,5-di-(1',1'-dimethylbenzyl)salicylimino) hafnium(IV) dibenzyl;
bis(N-iso-butyl-3,5-di-(1',1'-dimethylbenzyl)salicylimino) zirconium(IV) dibenzyl;
bis(N-iso-butyl-3,5-di-(1',1'-dimethylbenzyl)salicylimino) zirconium(IV) dichloride;
bis(N-hexyl-3,5-di-(1',1'-dimethylbenzyl)salicylimino)zirconium(IV) dibenzyl;
bis(N-phenyl-3,5-di-(1',1'-dimethylbenzyl)salicylimino)zirconium(IV) dibenzyl;
bis(N-iso-propyl-3,5-di-(1'-methylcyclohexyl)salicylimino) zirconium(IV) dibenzyl;
bis(N-benzyl-3-t-butylsalicylimino)zirconium(IV) dibenzyl;
bis(N-benzyl-3-triphenylmethylsalicylimino)zirconium(IV) dibenzyl;
bis(N-iso-propyl-3,5-di-trimethylsilylsalicylimino)zirconium(IV) dibenzyl;
bis(N-iso-propyl-3-(phenyl)salicylimino)zirconium(IV) dibenzyl;
bis(N-benzyl-3-(2',6'-di-iso-propylphenyl)salicylimino)zirconium(IV) dibenzyl;
bis(N-benzyl-3-(2',6'-di-phenylphenyl)salicylimino)zirconium(IV) dibenzyl;
bis(N-benzyl-3-t-butyl-5-methoxysalicylimino)zirconium (IV) dibenzyl;
bis(2-(2H-benzotriazol-2-yl)-4,6-di-t-amylphenoxide)zirconium(IV) dibenzyl;
bis(2-(2H-benzotriazol-2-yl)-4,6-di-t-amylphenoxide)zirconium(IV) dichloride;
bis(2-(2H-benzotriazol-2-yl)-4,6-di-t-amylphenoxide)zirconium(IV) di(bis(dimethylamide));
bis(2-(2H-benzotriazol-2-yl)-4,6-di-(1',1'-dimethylbenzyl) phenoxide)zircon ium(IV) dibenzyl;
bis(2-(2H-benzotriazol-2-yl)-4,6-di-t-amylphenoxide)titanium(IV) dibenzyl;
bis(2-(2H-benzotriazol-2-yl)-4,6-di-(1',1'-dimethylbenzyl) phenoxide)titanium(IV) dibenzyl;
bis(2-(2H-benzotriazol-2-yl)-4,6-di-(1',1'-dimethylbenzyl) phenoxide)titanium(IV) dichloride;
bis(2-(2H-benzotriazol-2-yl)-4,6-di-(1',1'-dimethylbenzyl) phenoxide)hafnium(IV) dibenzyl;
(N-phenyl-3,5-di-(1',1'-dimethylbenzyl)salicylimino)zirconium(IV) tribenzyl;
(N-(2',6'-di-iso-propylphenyl)-3,5-di-(1',1'-dimethylbenzyl) salicylimino)zirconium(IV) tribenzyl;
(N-(2',6'-di-iso-propylphenyl)-3,5-di-(1',1'-dimethylbenzyl) salicylimino)titanium(IV) tribenzyl;
and (N-(2',6'-di-iso-propylphenyl)-3,5-di-(1',1'-dimethylbenzyl)salicylimino)zirconium(IV) trichloride.

Additional Catalyst Compounds

The at least one MAO-activable compound may include one or more complexes known as transition metal catalysts based on bidentate ligands containing pyridine or quinoline moieties, such as those described in U.S. patent application Ser. No. 09/103,620, filed Jun. 23, 1998, now U.S. Pat. No. 6,103,657.

In one embodiment, these catalyst compounds are represented by the formula:

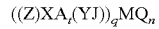  Formula XII where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

In one exemplary embodiment, the catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins," J. Am. Chem.

Soc. 1995, 117, 6414-6415 and Johnson, et al., "Copolymerization of Ethylene and Propylene with Functionalized Vinyl Monomers by Palladium(II) Catalysts," J. Am. Chem. Soc., 1996, 118, 267-268, and WO 96/23010 published Aug. 1, 1996, WO 99/02472, U.S. Pat. Nos. 5,852,145, 5,866,663 and 5,880,241. These complexes can be either dialkyl ether adducts, or alkylated reaction products of the described dihalide complexes that can be activated to a cationic state by the activators of this invention described below.

Other catalyst compounds include those nickel complexes described in WO 99/50313.

Also included are those diimine based ligands of Group 8 to 10 metal catalyst compounds disclosed in PCT publications WO 96/23010 and WO 97/48735 and Gibson, et al., Chem. Comm., pp. 849-850 (1998).

Other useful catalyst compounds are those Group 5 and 6 metal imido complexes described in EP-A2-0 816 384 and U.S. Pat. No. 5,851,945. In addition, metallocene catalysts include bridged bis(arylamido) Group 4 compounds described by D. H. McConville, et al., in Organometallics 1195, 14, 5478-5480. In addition, bridged bis(amido) catalyst compounds are described in WO 96/27439. Other useful catalysts are described as bis(hydroxy aromatic nitrogen ligands) in U.S. Pat. No. 5,852,146. Other useful catalysts containing one or more Group 15 atoms include those described in WO 98/46651. In an exemplary embodiment, the at least one MAO-activatable compound may include compounds described as bridged bi-aromatic ligand compounds in WO 03/091262 A1.

Conventional Transition Metal Catalysts

In another exemplary embodiment, conventional transition metal catalysts may be included in the at least one MAO-activatable compound used in the practice of this invention. Conventional transition metal catalysts are those traditional Ziegler-Natta, vanadium and Phillips-type catalysts well known in the art. For example, the Ziegler-Natta catalysts include those described in Ziegler-Natta Catalysts and Polymerizations, John Boor, Academic Press, New York, 1979. Examples of conventional transition metal catalysts are also discussed in U.S. Pat. Nos. 4,115,639, 4,077,904, 4,482,687, 4,564,605, 4,721,763, 4,879,359 and 4,960,741. The conventional transition metal catalyst compounds that may be used in the present invention include transition metal compounds from Groups 3 to 17, preferably 4 to 12, more preferably 4 to 6 of the Periodic Table of Elements.

Preferred conventional transition metal catalysts may be represented by the formula: $MR_x$, where M is a metal from Groups 3 to 17, preferably Group 4 to 6, more preferably Group 4, most preferably titanium; R is a halogen or a hydrocarbyloxy group; and x is the oxidation state of the metal M. Non-limiting examples of R include alkoxy, phenoxy, bromide, chloride and fluoride. Non-limiting examples of conventional transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional transition metal catalyst compounds based on magnesium/titanium electron-donor complexes that are useful in the invention are described in, for example, U.S. Pat. Nos. 4,302,565 and 4,302,566. In an exemplary embodiment, the conventional transition metal catalyst compound is a $MgTiCl_6$ (ethyl acetate)$_4$ derivative.

British Patent application 2,105,355 and U.S. Pat. No. 5,317,036, describes various conventional vanadium catalyst compounds. Non-limiting examples of conventional vanadium catalyst compounds include vanadyl trihalide, alkoxy halides and alkoxides such as $VOCl_3$, $VO(OC_2H_5)_3$ and $VOCl_2(OBu)$, where "Bu" represents butyl; vanadium tetrahalide and vanadium alkoxy halides such as $VCl_4$ and $VCl_3$(OBu); vanadium and vanadyl acetyl acetonates and chloroacetyl acetonates such as $V(AcAc)_3$ and $VOCl_2(AcAc)$ where (AcAc) is an acetyl acetonate. The preferred conventional vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,709,853, 3,709,954, 3,231,550, 3,242,099 and 4,077,904.

Still other conventional transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436.

Other catalysts may include cationic catalysts such as $AlCl_3$, and other cobalt, iron, nickel and palladium catalysts well known in the art. Examples may be found in, inter alia, U.S. Pat. Nos. 3,487,112, 4,472,559, 4,182,814 and 4,689,437.

It is also contemplated that other catalysts can be combined with the catalyst compounds in the catalyst composition of the invention. Examples may be found in, inter alia, U.S. Pat. Nos. 4,937,299, 4,935,474, 5,281,679, 5,359,015, 5,470,811, and 5,719,241.

It is further contemplated that one or more of the catalyst compounds described above or catalyst systems may be used in combination with one or more conventional catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996.

Activator

As used herein, the term "activator" is defined to be any compound or combination of compounds, supported or unsupported, which can activate a catalyst compound (e.g., Ziegler-Natta, metallocenes, Group 15-containing catalysts, etc.), such as by creating a cationic species from the catalyst component. Typically, this involves the abstraction of at least one leaving group (X group in the formulas/structures above) from the metal center of the catalyst component. The catalyst components of the present invention are thus activated towards olefin polymerization using such activators. Exemplary embodiments of such activators include Lewis acids such as cyclic or oligomeric poly(hydrocarbylaluminum oxides), alkylaluminum compounds and so called non-coordinating ionic activators ("NCA") (alternately, "ionizing activators" or "stoichiometric activators"), or any other compound that can convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO"), and alkylaluminum compounds as activators, and/or ionizing activators (neutral or ionic) such as tri(n-butyl)ammonium tetrakis(pentafluorophenyl)boron and/or trisperfluorophenyl boron metalloid precursors to activate desirable metallocenes described herein. MAO and other aluminum-based activators are well known in the art. Ionizing activators are well known in the art and are described by, for example, Eugene Yu-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). The activators may be associated with or bound to a support, either in association with the catalyst component (e.g., metallocene) or separate from the catalyst component, such as described by Gregory G. Hlalky, *Heterogeneous Single-Site Catalysts for Olefin Polymerization* 100(4) CHEMICAL REVIEWS 1347-1374 (2000).

Non-limiting examples of alkylaluminum compounds which may be utilized as activators for the catalyst precursor compounds for use in the systems and processes of the present invention include trimethylaluminum, triethylaluminum, tri-isobutylaluminum, tri-n-hexylaluminum, tri-n-octylaluminum and the like. In an exemplary embodiment of the present invention, the activator is trimethylaluminum. In another exemplary embodiment of the present invention, the activator is a mixture of trimethylaluminum in heptane, and water.

Examples of neutral ionizing activators include Group 13 tri-substituted compounds, in particular, tri-substituted boron, tellurium, aluminum, gallium and indium compounds, and mixtures thereof. The three substituent groups are each independently selected from the group consisting of alkyls, alkenyls, halogen, substituted alkyls, aryls, arylhalides, alkoxy and halides. In one exemplary embodiment, the three groups are independently selected from the group consisting of halogen, mono or multicyclic (including halosubstituted) aryls, alkyls, and alkenyl compounds and mixtures thereof. In another exemplary embodiment, the three groups are selected from the group consisting of alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another exemplary embodiment, the three groups are selected from the group consisting of alkyls having 1 to 4 carbon groups, phenyl, naphthyl and mixtures thereof. In yet another exemplary embodiment, the three groups are selected from the group consisting of highly halogenated alkyls having 1 to 4 carbon groups, highly halogenated phenyls, and highly halogenated naphthyls and mixtures thereof. As used herein, the phrase "highly halogenated" will be understood to mean that at least 50% of the hydrogens are replaced by a halogen group selected from the group consisting of fluorine, chlorine and bromine. In yet another exemplary embodiment, the neutral stoichiometric activator is a tri-substituted Group 13 compound comprising highly fluorided aryl groups, the groups being highly fluorided phenyl and highly fluorided naphthyl groups.

In another exemplary embodiment, the neutral tri-substituted Group 13 compounds are boron compounds such as trisperfluorophenyl boron, trisperfluoronaphthyl boron, tris(3,5-di(trifluoromethyl)phenyl)boron, tris(di-t-butylmethylsilyl)perfluorophenylboron, and other highly fluorinated trisarylboron compounds and combinations thereof, and their aluminum equivalents. Other suitable neutral ionizing activators include those described in, for example, U.S. Pat. No. 6,399,532 B1, U.S. Pat. No. 6,268,445 B1, as well as those described in 19 ORGANOMETALLICS 3332-3337 (2000), and in 17 ORGANOMETALLICS 3996-4003 (1998).

Illustrative, non-limiting examples of ionic ionizing activators include trialkyl-substituted ammonium salts such as triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron and the like; N,N-dialkyl anilinium salts such as N,N-dimethylanilinium tetra(phenyl)boron, N,N-diethylanilinium tetra(phenyl)boron, N,N-2,4,6-pentamethylanilinium tetra(phenyl)boron and the like; dialkyl ammonium salts such as di-(isopropyl)ammonium tetra(pentafluorophenyl)boron, dicyclohexylammonium tetra(phenyl)boron and the like; and triaryl phosphonium salts such as triphenylphosphonium tetra(phenyl)boron, tri(methylphenyl)phosphonium tetra(phenyl)boron, tri(dimethylphenyl)phosphonium tetra(phenyl)boron and the like, and their aluminum equivalents.

In yet another exemplary embodiment of the activator useful in accordance with the present invention, an alkylaluminum can be used in conjunction with a heterocyclic compound. The ring of the heterocyclic compound may include at least one nitrogen, oxygen, and/or sulfur atom, and, in one exemplary embodiment, includes at least one nitrogen atom. The heterocyclic compound includes 4 or more ring members in one exemplary embodiment, and 5 or more ring members in another exemplary embodiment.

The heterocyclic compound for use as an activator with an alkylaluminum may be unsubstituted, or may be substituted with one, or with a combination of, substituent group(s). Examples of suitable substituents include, but are not limited to, halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituents groups may also be substituted with halogens, particularly fluorine or bromine, or heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, such as, for example, tertiary butyl, isopropyl, and the like. Other examples of substituents include, but are not limited to, fluoromethyl, fluoroethyl, difluoroethyl, iodopropyl, bromohexyl or chlorobenzyl.

In one exemplary embodiment, the heterocyclic compound is unsubstituted. In another exemplary embodiment, one or more positions on the heterocyclic compound are substituted with a halogen atom or a halogen atom containing group, such as, for example, a halogenated aryl group. In one exemplary embodiment, the halogen is selected from the group consisting of chlorine, bromine and fluorine, and is selected from the group consisting of fluorine and bromine in another exemplary embodiment. In yet another exemplary embodiment, the halogen is fluorine.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5,-dimethylpyrroles, 3-pentafluorophenylpyrrole, 4,5,6,7-tetrafluoroindole or 3,4-difluoropyrroles.

In one exemplary embodiment, the heterocyclic compound described above is combined with an alkyl aluminum or an alumoxane to yield an activator compound which, upon reaction with a catalyst component, for example a metallocene, produces an active polymerization catalyst. Non-limiting examples of alkylaluminums include trimethylaluminum, triethylaluminum, triisobutylaluminum, tri-n-hexylaluminum, tri-n-octylaluminum, tri-iso-octylaluminum, triphenylaluminum, and combinations thereof.

Other activators include those described in WO 98/07515, such as tris(2,2', 2"-nonafluorobiphenyl) fluoroaluminate. Combinations of activators are also contemplated by the invention; for example, a combination of alumoxanes and ionizing activators. Other activators include aluminum/boron complexes, perchlorates, periodates and iodates including their hydrates; lithium (2,2'-bisphenyl-ditrimethylsilicate) .4THF; and silylium salts in combination with a non-coordinating compatible anion. Also, methods of activation such as using radiation, electro-chemical oxidation, and the like are also contemplated as activating methods for the purposes of rendering the neutral metallocene-type catalyst compound or precursor to a metallocene-type cation capable of polymerizing olefins. Other activators or methods for activating a metallocene-type catalyst compound are described in, for example, U.S. Pat. Nos. 5,849,852, 5,859,653 and 5,869,723 and WO 98/32775.

In general, the activator and catalyst component(s) are combined in mole ratios of activator to catalyst component that are, in one exemplary embodiment, in the range of from 1000:1 to 0.1:1. In another exemplary embodiment, the mole ratios of activator to catalyst component range from 300:1 to 1:1, and from 150:1 to 1:1 in yet a more particular embodiment, and from 50:1 to 1:1 in yet a more particular embodiment, and from 10:1 to 0.5:1 in yet a more particular embodiment, and from 3:1 to 0.3:1 in yet a more particular embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one exemplary embodiment, and from 10:1 to 10,000:1 in another exemplary embodiment, and from 50:1 to 2,000:1 in a more particular embodiment. When the activator is a neutral or ionic ionizing activator such as a boron alkyl and the ionic salt of a boron alkyl, the mole ratio of activator to catalyst component ranges from 0.5:1 to 10:1 in one exemplary embodiment, and from 1:1 to 5:1 in yet a more particular embodiment.

More particularly, the molar ratio of aluminum (provided by, for example, MAO) to transition metal "M" ranges from 40:1 to 500:1 in one exemplary embodiment; and ranges from 50:1 to 400:1 in another exemplary embodiment; and ranges from 60:1 to 300:1 in yet another exemplary embodiment, and ranges from 70:1 to 200:1 in yet another exemplary embodiment; and ranges from 80:1 to 175:1 in yet another exemplary embodiment; and ranges from 90:1 to 125:1 in yet another exemplary embodiment, wherein a desirable molar ratio can be any combination of any upper limit with any lower limit described herein.

In an exemplary embodiment, the supported, treated catalyst system(s) are prepared by combining them with the activators, and further combining them with up to 2.0 wt % (by weight of the supported, treated catalyst system) of an antistatic agent, such as an ethoxylated or methoxylated amine, an example of which is Atmer AS-990 (available from Ciba of Tarrytown, N.Y.). In certain other exemplary embodiments of the present invention, the antistatic agent is present in the supported, treated catalyst system in an amount less than 2.0 wt %, such as, for example, 1.0 wt %. In still other exemplary embodiments of the present invention, the antistatic agent is absent or substantially absent from the supported, treated catalyst system.

Support

A support may also be present as part of the supported, treated catalyst systems of the present invention. Supports (as well as methods of supporting, modifying, and activating supports for single-site catalysts such as metallocenes) are discussed in, for example, 1 METALLOCENE-BASED POLYOLEFINS 173-218 (J. Scheirs & W. Kaminsky eds., John Wiley & Sons, Ltd. 2000). The terms "support" or "carrier," as used herein, are used interchangeably and refer to any support material, a porous support material in one exemplary embodiment, including inorganic or organic support materials. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, glass beads, and polymers such as polyvinylchloride and substituted polystyrene, functionalized or crosslinked organic supports such as polystyrene divinyl benzene polyolefins or polymeric compounds, and mixtures thereof, and graphite, in any of its various forms.

The support may be contacted with the other components of the catalyst system in any number of ways. In one exemplary embodiment, the support is contacted with the activator to form an association between the activator and support, or a "bound activator." In another exemplary embodiment, the catalyst component may be contacted with the support to form a "bound catalyst component." In yet another exemplary embodiment, the support may be contacted with the activator and catalyst component together, or with each partially in any order. The components may be contacted by any suitable means, such as in a solution, slurry, or solid form, or some combination thereof, and may be heated to any desirable temperature to effectuate a desirable chemical/physical transformation.

In one exemplary embodiment, desirable carriers are inorganic oxides that include Group 2, 3, 4, 5, 13 and 14 oxides and chlorides, and more particularly, inorganic oxides and chlorides of Group 13 and 14 atoms. In more particular exemplary embodiments, support materials include, but are not limited to, silica, alumina, silica-alumina, magnesium chloride, graphite, and mixtures thereof. Other useful supports include magnesia, titania, zirconia, montmorillonite (as disclosed in EP 0 511 665 B1, for example), phyllosilicate, and the like. Also, combinations of these support materials may be used, such as, for example, silica-chromium, silica-alumina, silica-titania, and the like. Additional support materials may include those porous acrylic polymers described in EP 0 767 184 B1.

In one aspect of the support useful in the invention, the support possesses a surface area in the range of from 10 to 700 $m^2/g$, pore volume in the range of from 0.1 to 4.0 $cm^3/g$ and average particle size in the range of from 5 to 500 μm. In another exemplary embodiment, the surface area of the carrier is in the range of from 50 to 500 $m^2/g$, pore volume is in the range of from 0.5 to 3.5 $cm^3$ g, and average particle size is in the range of from 10 to 200 μm. In yet another exemplary embodiment, the surface area of the carrier is in the range is from 100 to 400 $m^2/g$, pore volume is in the range of from 0.8 to 3.0 $cm^3/g$, and average particle size is in the range of from 5 to 100 μm. The average pore size of the carrier of the invention typically has pore size in the range of from 10 to 1000 Å, from 50 to 500 Å in another exemplary embodiment, and from 75 to 350 Å in yet another exemplary embodiment.

In one exemplary embodiment of the present invention, the support is graphite, which may be used in a variety of forms, e.g., in one exemplary embodiment, the graphite is a powder; in another exemplary embodiment, the graphite is flake graphite. In another embodiment, the graphite has a particle size of from 1 to 500 microns. In still another embodiment, the graphite has a particle size ranging from 1 to 400 microns, while in yet another embodiment, the graphite has a particle size in the range of from 1 to 200 microns. In yet another embodiment, the graphite has a particle size in the range of from 1 to 100 microns.

In certain exemplary embodiments of the present invention, the support may be dehydrated or calcined. In one embodiment, the support is calcined prior to reaction with fluorine or another support-modifying compound. In another embodiment, the support is calcined and used without further modification. In still another exemplary embodiment, the support is calcined, then contacted with one or more activators and/or catalyst components. Suitable calcining temperatures range from 10° C. to 1500° C. in one embodiment, and from 200° C. to 1200° C. in another embodiment, and from 300° C. to 1000° C. in another embodiment, and from 350° C. to 900° C. in yet another embodiment, and from 400° C. to 850° C. in yet a more particular embodiment, and from 800° C. to 900° C. in yet a more particular embodiment, and from 810° C. to 890° C. in yet a more particular embodiment, wherein a desirable range comprises any combination of any upper temperature limit with any lower temperature limit. Calcining may take place in the absence of oxygen and moisture by using, for example, an atmosphere of dry nitrogen.

The support, especially an inorganic support or graphite support, may be pretreated such as by a halogenation process or other suitable process that, for example, associates a chemical species with the support either through chemical bonding, ionic interactions, or other physical or chemical interaction. In one embodiment, the support is fluorided. The fluorine compounds suitable for providing fluorine for the support are desirably inorganic fluorine containing compounds. Such inorganic fluorine containing compounds may be any compound containing a fluorine atom, as long as the compound does not contain a carbon atom. Particularly desirable are inorganic fluorine containing compounds selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$.

A desirable method of treating the support with the fluorine compound is to dry mix the two components, by blending them at a concentration of from 0.01 to 10.0 millimole F/gram of support in one embodiment, and in the range of from 0.05 to 6.0 millimole F/gram of support in another embodiment, and in the range of from 0.1 to 3.0 millimole F/gram of support in yet another embodiment. The fluorine compound can be dry mixed with the support either before or after charging to the vessel for dehydration or calcining of the support. Accordingly, in one exemplary embodiment the fluorine concentration present on the support is in the range of from 0.2 to 5 wt %, and from 0.6 to 3.5 wt % of support in another embodiment.

Another method of treating the support with the fluorine compound is to dissolve the fluorine in a solvent, such as water, and then contact the support with the fluorine-containing solution. When water is used and silica is the support, it is desirable to use a quantity of water that is less than the total pore volume of the support. Desirably, the support and, for example, fluorine compounds are contacted by any suitable means, such as by dry mixing or slurry mixing at a temperature of from 100° C. to 1000° C. in one embodiment, and from 200° C. to 800° C. in another embodiment, and from 300° C. to 600° C. in yet another embodiment, the contacting in any case taking place for between two to eight hours.

One embodiment of the support useful in the present invention is a so-called "enhanced support," prepared by heating support particles at a dehydration temperature of at least 800° C. or more, and between 800° C. and 100° C. in another embodiment, resulting in an enhanced support having a modified chemical structure. In a particular embodiment, the heating of the support takes place in an inert (e.g., $N_2$ or Ar) atmosphere, and in the absence of water. In preferred embodiments, increased productivity is achieved when the enhanced support is combined with the other parts of the bimetallic catalyst discussed herein, to form a supported bimetallic catalyst, to which is added at least one MAO-activatable compound to form a supported, treated catalyst system, which is then contacted with monomers during polymerization. In one exemplary embodiment, bimodal polyolefin compositions are produced by the polymerization process.

In one or more specific exemplary embodiments, an enhanced support is first prepared, preferably in the manner described below; then that enhanced support is treated (e.g., combined with ingredients that form the first catalyst) to provide a supported catalyst that includes the first catalyst component. In certain exemplary embodiments, that supported first catalyst is then treated in the presence of the second catalyst component to provide a supported bimetallic catalyst to which is added at least one MAO-activatable compound to form a supported, treated catalyst system.

The enhanced support is prepared by any suitable means, and more particularly, by any means wherein water is removed from the support, such as by heating, exposure to low pressure, chemical treatment, or combinations thereof. Heating the support at a dehydration temperature of at least 800° C., and between 800° C. and 1000° C. in a particular embodiment, provides an enhanced support (for example, enhanced silica) that provides surprisingly improved results over a support that is dehydrated at lower temperatures (e.g., below 800° C.), even slightly lower temperatures (for example, 760° C.). While not immediately apparent from the enhancement procedure itself, and while not wishing to be limited by a particular theory, it is contemplated that the heat treatment results in an actual chemical and/or physical change in the support structure itself, which only reveals its beneficial structure when combined with a first and second catalyst components described herein, and placed in the context of an actual polymerization.

In a particular embodiment, the support useful in the present invention is a Group 13 or 14 inorganic oxide support having a pore volume ranging from 0.8 to 3 $cm^3/g$ and a surface area of from 100 to 500 $m^2/g$. This support is desirably dehydrated as described herein in one embodiment. A preferred support is an amorphous high surface area silica, such as Davison 952 or Sylopol® 955, sold by Davison Chemical Division of W.R. Grace and Company. Those silicas are in spherical form, prepared by the spray drying process, with a surface area of 300 $m^2/g$ and a pore volume of 1.65 $cm^3/g$. An exemplary procedure for dehydrating the silica at 600° C. is set forth in U.S. Pat. No. 5,525,678. The enhanced support is then combined with a non-polar hydrocarbon diluent to form a support slurry, which can be stirred and optionally heated during mixing.

A variety of non-polar hydrocarbon diluents can be used to form the support slurry, but any non-polar hydrocarbon selected should remain in liquid form at all relevant reaction temperatures, and the ingredients used to form the first catalyst component should be at least partially soluble in the non-polar hydrocarbon. Accordingly, the non-polar hydrocarbon diluent is considered to be a "solvent" herein, even though in certain embodiments the ingredients are only partially soluble in the hydrocarbon.

Examples of suitable non-polar hydrocarbons include $C_4$-$C_{10}$ linear or branched alkanes, cycloalkanes and aromatics. More specifically, a non-polar alkane can be isopentane, hexane, isohexane, n-heptane, octane, nonane, or decane; a non-polar cycloalkane such as cyclohexane; or an aromatic such as benzene, toluene, or ethylbenzene. Mixtures of different non-polar hydrocarbons can also be used.

The support slurry can be heated both during and after mixing of the support particles with the non-polar hydrocarbon solvent, but at the point when either or both of the catalysts are combined with the support slurry, the temperature of the slurry should be sufficiently low so that neither of the catalysts are inadvertently deactivated. Thus, the temperature of the support slurry (e.g., silica slurry) is preferably maintained at a temperature below 90° C., for example, from 25 to 70° C., or from 40 to 60° C. in another embodiment.

Method of Preparing the Supported, Treated Catalyst System of the Invention

The method for making the supported, treated catalyst system of the invention generally involves the combining, contacting, vaporizing, blending, bonding and/or mixing any of the above-described supported bimetallic catalyst systems made using any of the techniques described above, with at least one MAO-activatable compound. In an exemplary embodiment, the supported bimetallic catalyst system comprises both a first and a second transition metal. In an exemplary embodiment, the at least one MAO-activatable compound comprises a transition metal that is the same as the first transition metal. In an exemplary embodiment, the at least one MAO-activatable compound comprises a transition metal that is the same as the second transition metal. In an exemplary embodiment, the at least one MAO-activatable compound comprises a transition metal that is different from both the first and the second transition metals.

In an exemplary embodiment of the present invention, the third transition metal is present in the supported, treated catalyst systems of the present invention in a molar ratio (compared to the bimetallic catalyst) in the range of from 0.01 to 0.5.

In an exemplary embodiment of the present invention, the total transition metal loading of the supported, treated catalyst systems of the present invention ranges from 0.1 to 1.0 mmole of transition metal per gram of supported, treated catalyst system. In another exemplary embodiment, the total transition metal loading of the supported, treated catalyst system of the present invention ranges from 0.2 to 0.5 mmole of transition metal per gram of supported, treated catalyst system.

In one exemplary embodiment of the invention, a supported, treated catalyst system is made by contacting a preformed supported bimetallic catalyst system (generally comprising a bimetallic catalyst compound, a carrier, and an activator) with at least one MAO-activatable compound. In an exemplary embodiment, the preformed supported bimetallic catalyst system can be contacted with the at least one MAO-activatable compound in a solution, or with the at least one MAO-activatable compound in a dry or substantially dry state. In yet another exemplary embodiment, the preformed supported bimetallic catalyst system can be dry or substantially dry or in a solution, and then combined with the at least one MAO-activatable compound in either a solution form, a dry state or a substantially dry state. The preformed supported bimetallic catalyst system can be in a dry or substantially dry state and then reslurried in a liquid such as mineral oil, toluene, or any other hydrocarbon prior to being combined with the at least one MAO-activatable compound. Alternatively, in an exemplary embodiment, the dry or substantially dry preformed supported bimetallic catalyst system is added to the at least one MAO-activatable compound in a mineral oil slurry or a hydrocarbon liquid, such a toluene or isopentane, for example.

In certain exemplary embodiments, the contact temperature for combining the supported bimetallic catalyst system and the at least one MAO-activatable compound is in the range of from 0° C. to about 100° C., more preferably from 15° C. to about 75° C., most preferably at about ambient temperature and pressure.

In certain exemplary embodiments, the supported bimetallic catalyst system is contacted with the at least one MAO-activatable compound for a period of time greater than one second, preferably from about 1 minute to about 48 hours, more preferably from about 10 minutes to about 10 hours, and most preferably from about 30 minutes to about 6 hours. The period of contacting refers to the mixing time only.

Polymerization Process

The supported, treated catalyst system of the present invention is suitable for use in any olefin prepolymerization and/or polymerization process over a wide range of temperatures and pressures and other conditions. Suitable polymerization processes include solution, gas phase, slurry phase and a high pressure process, or a combination thereof. A desirable process is a gas phase or slurry phase polymerization of one or more olefins, at least one of which is ethylene or propylene. In a particular exemplary embodiment, the process of the present invention is directed toward a gas phase polymerization process of one or more olefin monomers having from 2 to 30 carbon atoms, from 2 to 12 carbon atoms in a more particular embodiment, and from 2 to 8 carbon atoms in yet a more particular embodiment. The invention is particularly well suited to the polymerization of two or more olefin monomers of ethylene, propylene, 1-butene, 1-pentene, 1-hexene, 1-heptene, 1-octene, 1-nonene, 4-methyl-1-pentene, 1-isobutene, 1-isobutene and 1-decene.

Other monomers useful in the process of the invention include, but are not limited to, ethylenically unsaturated monomers, diolefins having 4 to 18 carbon atoms, conjugated or nonconjugated dienes, polyenes, vinyl monomers and cyclic olefins. Non-limiting monomers useful in the invention may also include norbornene, norbornadiene, isobutylene, isoprene, vinylbenzocyclobutane, styrenes, alkyl substituted styrene, ethylidene norbornene, dicyclopentadiene and cyclopentene, among others.

In an exemplary embodiment of a process of the invention, a copolymer of ethylene is produced by a gas phase polymerization process wherein ethylene is polymerized with a comonomer having at least one α-olefin having from 4 to 15 carbon atoms, from 4 to 12 carbon atoms in yet a more particular embodiment, and from 4 to 8 carbon atoms in yet a more particular embodiment.

In another exemplary embodiment of a process of the invention, ethylene is polymerized with at least two different comonomers (one of which may be, optionally, a diene) to form a terpolymer.

A typical gas phase polymerization process may employ a continuous cycle, in one part whereof a cycling gas stream (otherwise known as a recycle stream or fluidizing medium) is heated in the reactor by the heat of polymerization. This heat is removed from the recycle composition in another part of the cycle by a cooling system external to the reactor.

Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399, 4,588,790, 5,028,670, 5,317,036, 5,352,749, 5,405,922, 5,436,304, 5,453,471, 5,462,999, 5,616,661 and 5,668,228.)

The reactor pressure in a gas phase process may vary from 100 psig (690 kPa) to 500 psig (3448 kPa) in one exemplary embodiment, from 200 psig (1379 kPa) to 400 psig (2759 kPa) in a more particular embodiment, and from 250 psig (1724 kPa) to 350 psig (2414 kPa) in yet a more particular embodiment.

The reactor temperature in a gas phase process may vary from 30° C. to 120° C. in one exemplary embodiment, from 60° C. to 115° C. in a more particular embodiment, from 70° C. to 110° C. in yet a more particular embodiment, and from 70° C. to 95° C. in yet a more particular embodiment, or as set out further below.

The supported, treated catalyst systems useful in the gas phase polymerization process of the invention include a supported bimetallic catalyst system (generally comprising a first and second catalyst components, and one or more activators) that has been contacted with at least one MAO-activatable compound. The supported, treated catalyst system is activated by any suitable means known in the art, either before introduction into the polymerization reactor or in situ. In a particular exemplary embodiment, the supported, treated catalyst system is fed to the reactor in a dry (no diluent) state. In another exemplary embodiment, the supported, treated catalyst system is suspended in a diluent (e.g., $C_5$ to $C_{15}$ hydrocarbon) comprising from 5 wt % to 100 wt % mineral oil or silicon oil and fed into the reactor.

The gas-phase process of the present invention includes contacting the supported, treated catalyst system with monomers in a reactor vessel having a configuration desirable for the formation of a polyolefin. In one exemplary embodiment, the contacting may take place in a first reactor vessel, followed by transfer of the formed polymer into one or more additional reactor vessels to allow further polymerization, which optionally may be carried out by adding the same or different monomers and optionally by adding the same or different catalyst components, activators, and the like. In a particular embodiment of the present invention, the supported, treated catalyst system is contacted with monomers in a single reactor vessel (or "reactor"), followed by isolation of a finished polyolefin resin.

The gas phase reactor employing the supported, treated catalyst systems of the present invention is capable of producing from 500 lbs of polymer per hour (227 Kg/hr) to 200,000 lbs/hr (90,900 Kg/hr), and greater than 1000 lbs/hr (455 Kg/hr) in another exemplary embodiment, and greater than 10,000 lbs/hr (4540 Kg/hr) in yet another exemplary embodiment, and greater than 25,000 lbs/hr (11,300 Kg/hr) in yet another exemplary embodiment, and greater than 35,000 lbs/hr (15,900 Kg/hr) in yet another exemplary embodiment, and greater than 50,000 lbs/hr (22,700 Kg/hr) in yet another exemplary embodiment, and from 65,000 lbs/hr (29,000 Kg/hr) to 100,000 lbs/hr (45,500 Kg/hr) in yet another exemplary embodiment.

A slurry polymerization process generally uses pressures in the range of from 1 to 50 atmospheres and even greater, and temperatures in the range of 0° C. to 120° C. In a slurry polymerization, a suspension of solid, particulate polymer is formed in a liquid polymerization diluent medium, to which ethylene, comonomers, and often hydrogen, along with catalyst, are added. The suspension including diluent is intermittently or continuously removed from the reactor, where the volatile components are separated from the polymer and recycled, optionally after a distillation, to the reactor. The liquid diluent employed in the polymerization medium is typically an alkane having from 3 to 7 carbon atoms; in one exemplary embodiment the alkane is a branched alkane. The medium employed should be liquid under the conditions of polymerization and relatively inert. When a propane medium is used, the process is generally operated above the critical temperature and pressure of the reaction diluent. In one exemplary embodiment, a hexane or an isobutane medium is employed.

Another desirable polymerization technique of the invention is referred to as a particle form polymerization, or a slurry process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. Nos. 4,613,484 and 2 METALLOCENE-BASED POLYOLEFINS 322-332 (2000).

The slurry reactor employing the supported, treated catalyst systems of the present invention is capable of producing greater than 2000 lbs of polymer per hour (907 Kg/hr), and greater than 5000 lbs/hr (2268 Kg/hr) in another exemplary embodiment, and greater than 10,000 lbs/hr (4540 Kg/hr) in yet another exemplary embodiment. In another exemplary embodiment, the slurry reactor used in the process of the invention produces greater than 15,000 lbs of polymer per hour (6804 Kg/hr), and from 25,000 lbs/hr (11,340 Kg/hr) to 100,000 lbs/hr (45,500 Kg/hr) in yet another exemplary embodiment.

In one exemplary embodiment of the process of the invention, the slurry or gas phase process is operated in the presence of a supported, treated catalyst system of the present invention and in the absence of, or essentially free of, any scavengers, such as triethylaluminum, trimethylaluminum, tri-isobutylaluminum and tri-n-hexylaluminum and diethyl aluminum chloride, dibutyl zinc and the like. As used herein, the phrase "essentially free" will be understood to mean that these compounds are not deliberately added to the reactor or any reactor components, and if present, are present to less than 1 ppm in the reactor.

In another exemplary embodiment, one or all of the catalyst components that make up the supported, treated catalyst system of the present invention are combined with up to 10 wt % of a metal stearate, (preferably an aluminum stearate, more preferably aluminum distearate) based upon the weight of the supported, treated catalyst systems (or its components), and the stearate. In an alternate embodiment, a solution of the metal stearate is fed into the reactor. In another exemplary embodiment, the metal stearate is mixed with the catalyst and fed into the reactor separately. These agents may be mixed with the catalyst or may be fed into the reactor in a solution or a slurry with or without the supported, treated catalyst system or its components. More information on using aluminum stearate type additives may be found in U.S. patent application Ser. No. 09/113,261, filed Jul. 10, 1998, now U.S. Pat. No. 6,031,120.

As noted above, the polymerization process of the present invention may be carried out by using a solution process.

Examples of solution processes are described in, for example, U.S. Pat. Nos. 4,271,060, 5,001,205, 5,236,998, and 5,589,555.

By treating a supported, bimetallic catalyst system with at least one MAO-activatable compound, a supported, treated catalyst system of the present invention may be provided which demonstrates increased productivity when used in a polymerization process. In one exemplary embodiment, the productivity of the supported, treated catalyst system of the present invention is up to 25% greater than the productivity of a typical supported bimetallic catalyst system; in another exemplary embodiment, the productivity of the supported, treated catalyst system of the present invention is more than 25% greater than the productivity of a typical supported bimetallic catalyst system. In an exemplary embodiment, the supported, treated catalyst composition of the present invention has a productivity greater than 4,500 grams of polymer per gram of catalyst per hour, preferably greater than 5,000 grams of polymer per gram of catalyst per hour, more preferably greater than 6,000 grams of polymer per gram of catalyst per hour, and still more preferably greater than 7,000 grams of polymer per gram of catalyst per hour.

Furthermore, the treatment of the supported, bimetallic catalyst with at least one MAO-activatable compound to form a supported, treated catalyst system of the present invention leads to increased MAO efficiency when the supported, treated catalyst system of the present invention is used in a polymerization process. Generally, the supported treated catalyst system of the present invention has a greater MAO efficiency than that of a typical supported, bimetallic catalyst. In one exemplary embodiment, the supported, treated catalyst system of the present invention has an MAO efficiency that is up to 50% greater than that of a typical supported bimetallic catalyst. In another exemplary embodiment, the supported, treated catalyst system of the present invention has an MAO efficiency that is up to 100% greater than that of a typical supported bimetallic catalyst. In still another exemplary embodiment, the supported, treated catalyst system of the present invention has an MAO efficiency that is up to 150% greater than that of a typical supported bimetallic catalyst. In one exemplary embodiment, the supported, treated catalyst composition of the present invention has a MAO efficiency of at least 1,100 grams of polymer produced per mmol aluminum on the supported, treated catalyst per hour. In another exemplary embodiment, the supported, treated catalyst composition has a MAO efficiency of at least 2,000 grams of polymer produced per mmol aluminum on the supported, treated catalyst per hour.

Compounding, Processing and Articles Therefrom

The polyolefins of the present invention may be blended with additives to form compositions that can then be used in articles of manufacture. Those additives include antioxidants, nucleating agents, acid scavengers, plasticizers, stabilizers, anticorrosion agents, blowing agents, other ultraviolet light absorbers such as chain-breaking antioxidants, quenchers, antistatic agents, slip agents, pigments, dyes and fillers and cure agents, such as peroxide. These and other common additives in the polyolefin industry may be present in polyolefin compositions from 0.01 to 50 wt % in one exemplary embodiment, and from 0.1 to 20 wt % in another exemplary embodiment, and from 1 to 5 wt % in yet another exemplary embodiment, wherein a desirable range may comprise any combination of any upper wt % limit with any lower wt % limit.

In particular, antioxidants and stabilizers such as organic phosphites, hindered amines, and phenolic antioxidants may be present in the polyolefin compositions of the invention from 0.001 to 5 wt % in one exemplary embodiment, and from 0.01 to 0.8 wt % in another exemplary embodiment, and from 0.02 to 0.5 wt % in yet another exemplary embodiment. Non-limiting examples of organic phosphites that are suitable are tris(2,4-di-tert-butylphenyl)phosphite (IRGAFOS 168) and di(2,4-di-tert-butylphenyl)pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)symtriazine] (CHIMASORB 944); bis(1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-isocyanurate (IRGANOX 3114).

Fillers may be present from 0.1 to 50 wt % in one exemplary embodiment, and from 0.1 to 25 wt % of the composition in another exemplary embodiment, and from 0.2 to 10 wt % in yet another exemplary embodiment. Desirable fillers include, but are not limited to, titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art.

Fatty acid salts may also be present in the polyolefin compositions of the present invention. Such salts may be present from 0.001 to 2 wt % of the composition in one exemplary embodiment, and from 0.01 to 1 wt % in another exemplary embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

With respect to the physical process of producing the blend of polyolefin and one or more additives, sufficient mixing should take place to assure that a uniform blend will be produced prior to conversion into a finished product. The polyolefin suitable for use in the present invention can be in any physical form when used to blend with the one or more additives. In one exemplary embodiment, reactor granules, defined as the granules of polymer that are isolated from the polymerization reactor, are used to blend with the additives. The reactor granules have an average diameter of from 10 µm to 5 mm, and from 50 µm to 10 mm in another exemplary embodiment. Alternately, the polyolefin is in the form of pellets, such as, for example, having an average diameter of from 1 mm to 6 mm that are formed from melt extrusion of the reactor granules.

One method of blending the additives with the polyolefin is to contact the components in a tumbler or other physical blending means, the polyolefin being in the form of reactor granules. This can then be followed, if desired, by melt blending in an extruder. Another method of blending the components is to melt blend the polyolefin pellets with the additives directly in an extruder, Brabender or any other melt blending means.

The resultant polyolefin and polyolefin compositions of the present invention may be further processed by any suitable means such as by calendering, casting, coating, compounding, extrusion, foaming; all forms of molding including compression molding, injection molding, blow molding, rotational molding, and transfer molding; film blowing or casting and all methods of film formation to achieve, for example, uniaxial or biaxial orientation; thermoforming, as well as by lamination, pultrusion, protrusion, draw reduction, spinbonding, melt spinning, melt blowing, and other forms of fiber and nonwoven fabric formation, and combinations thereof. These and other forms of suitable processing techniques are described in, for example, PLASTICS PROCESSING (Radian Corporation, Noyes Data Corp. 1986).

In the case of injection molding of various articles, simple solid state blends of the pellets serve equally as well as pelletized melt state blends of raw polymer granules, of granules with pellets, or of pellets of the two components since the forming process includes a remelting and mixing of the raw material. In the process of compression molding of medical devices, however, little mixing of the melt components occurs, and a pelletized melt blend would be preferred over simple solid state blends of the constituent pellets and/or granules. Those skilled in the art will be able to determine the appropriate procedure for blending of the polymers to balance the need for intimate mixing of the component ingredients with the desire for process economy.

Common rheological properties, processing methods and end use applications of metallocene based polyolefins are discussed in, for example, 2 METALLOCENE-BASED POLYOLEFINS 400-554 (John Scheirs & W. Kaminsky, eds. John Wiley & Sons, Ltd. 2000). The polyolefinic compositions of the present invention are suitable for such articles as films, fibers and nonwoven fabrics, extruded articles and molded. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multilayered constructions in the form of bottles, tanks, large hollow articles, rigid food containers and toys, etc.

Other desirable articles that can be made from and/or incorporate the polyolefins of the present invention include automotive components, sporting equipment, outdoor furniture (e.g., garden furniture) and playground equipment, boat and water craft components, and other such articles. More particularly, automotive components include such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Further useful articles and goods may be formed economically or incorporate the polyolefins produced by the practice of our invention including: crates, containers, packaging material, labware, office floor mats, instrumentation sample holders and sample windows; liquid storage containers for medical uses such as bags, pouches, and bottles for storage and IV infusion of blood or solutions; wrapping or containing food preserved by irradiation, other medical devices including infusion kits, catheters, and respiratory therapy, as well as packaging materials for medical devices and food which may be irradiated by gamma or ultraviolet radiation including trays, as well as stored liquid (particularly water, milk, or juice) containers including unit servings and bulk storage containers.

EXAMPLES

To facilitate a better understanding of the present invention, the following illustrative examples of some of the preferred exemplary embodiments are given. In no way should such examples be read to limit the scope of the invention.

The productivity of the ethylene polymerization run described hereinbelow was measured in grams polyethylene produced per gram of supported (or of supported, treated) catalyst composition per hour.

The "MAO Efficiency" was calculated as the grams of polyethylene produced per mmol Al [contributed by MAO] on the supported (or supported, treated) catalyst per hour.

The "PDI" is the Polydispersity Index, which is equivalent to Molecular Weight Distribution (Mw/Mn, where "Mw" is the weight average molecular weight and "Mn" is the number average molecular weight). PDI was determined by gel permeation chromatography using Polymer Laboratories' GPC-HT-220 instrument.

"TM" is the transition metal loading for a particular catalyst compound, expressed in mmole of transition metal per gram of supported, treated catalyst compound, calculated by summing the millimoles of each transition metal present in a gram of a particular supported (or supported, treated) catalyst compound.

"TMA" is trimethylaluminum in heptane, and was purchased from Aldrich Chemical Company, Inc.

"MAO" is methylalumoxane in toluene, available from Albemarle Corporation.

"BuCpZCl" is bis(n-butylcyclopentadienyl)zirconium dichloride, and was purchased from Boulder Scientific Company.

"BuCpZF" is bis(n-butylcyclopentadienyl)zirconium difluoride, and can be obtained from Boulder Scientific Company.

"TMCpPrCpZ" is (tetramethylcyclopentadienyl) (n-propylcyclopentadienyl)zirconium dichloride, and was purchased from Boulder Scientific Company.

"PMCpPrCpZ" is (pentamethylcyclopentadienyl) (n-propylcyclopentadienyl)zirconium dichloride, and was purchased from Boulder Scientific Company.

"MeBuCpZ" is bis(1,3-methylbutylcyclopentadienyl)zirconium dichloride, and was purchased from Boulder Scientific Company.

"HN3Z" is bis(phenylmethyl)[N'-(2,4,6-trimethylphenyl)-N-[2-[(2,4,6-trimethylphenyl)amino-kN]ethyl]-1,2-ethanediamino(2-)kN,kN]zirconium, and was purchased from Boulder Scientific Company.

"HFPF" is bis(n-propylcyclopentadienyl)hafnium difluoride, and was purchased from Crompton Corporation.

Kaydol, a white mineral oil, was purchased from Crompton Corporation, and was purified first by being degassed with nitrogen for 1 hour, followed by heating at 80° C. under vacuum for 10 hours.

Preparation of Catalyst A (Base Catalyst 1)

A silica slurry was prepared in a Schlenk flask by adding Davison-grade 955 silica (2.00 grams), which previously was calcined at 800° C. for 4 hours, and heptane (60 ml). The flask was placed into an oil bath kept at 55° C. Dibutylmagnesium (1.44 mmol) was added to the stirred silica slurry at 55° C. and stirring was continued for 1 hour. 1-Butanol (1.368 mmol) was added at 55° C., and the mixture was stirred for another 1 hour. Then, $TiCl_4$ (0.864 mmol) was added at 55° C. to the reaction medium, and stirring was continued for 1 hour. After removing the flask from the oil bath and allowing it to cool to ambient temperature, a toluene solution (4.4 ml) containing MAO (19.04 mmol Al) and BuCpZCl (0.1904 mmol, 0.077 grams) was added to the mixture. After stirring for 1 hour, the flask was placed into an oil bath (50° C.) and the solvents were removed under a nitrogen purge to give a free-flowing brown powder. The catalyst thus prepared has a Ti loading of 0.257 mmol per gram of catalyst and a Zr loading of 0.0445 mmol per gram of catalyst. The total transition metal loading (TM) is 0.302 mmol per gram of catalyst. The aluminum loading (and, thus, the MAO loading) for Catalyst A is 4.1 mmole per gram of catalyst.

Preparation of Catalyst B (Base Catalyst 2)

Catalyst B was prepared using the same procedure described immediately above, except that BuCpZF was used as the metallocene component instead of BuCpZCl. Catalyst B has a Ti loading of 0.246 mmol per gram of catalyst and a Zr loading of 0.0372 mmol per gram of catalyst, giving a total transition metal loading of 0.283 mmol per gram of catalyst. The aluminum loading (and, thus, the MAO loading) for Catalyst B is 3.9 mmole per gram of catalyst.

Preparation of Catalyst C

Catalyst C, a catalyst of the present invention, was prepared by first slurrying 1.076 grams of Catalyst A in 28.0 grams of Kaydol, at room temperature, then adding 0.0247 mmole of BuCpZCl (10 mg) in a 2.0 gram solution of Kaydol. The resulting mixture was stirred at room temperature for 2 hours before being used for polymerization.

The 1.076 grams of Catalyst A contributed 0.3249 mmol of transition metal to Catalyst C (e.g., 1.076 grams Catalyst A×0.302 mmol TM/gram Catalyst A=0.3249 mmol TM). Accordingly, the total transition metal loading of Catalyst C was 0.322 mmol TM per gram of catalyst (e.g., [0.3249+0.0247]/[1.076+0.010]=0.322 mmol TM/gram catalyst). The molar ratio of the third transition metal component (BuCpZCl) to the base catalyst was 0.076 (e.g., 0.0247 mmole BuCpZCl/[(0.302 mmol TM/gram Catalyst A)*(1.076 gram Catalyst A)]=0.076). The MAO loading of Catalyst C was therefore 4.06 (e.g., 4.1 mmole/gram Catalyst A*(1.076 gram/1.086 gram)=4.06 mmol/gram catalyst).

Preparation of Catalyst D

Catalyst D, a catalyst of the present invention, was prepared by first slurrying 0.532 grams of Catalyst B in 13.71 grams of Kaydol, at room temperature, then adding 0.0054 mmole of TMCpPrCpZ (2 mg) in a 2.0 gram solution of Kaydol. The resulting mixture was stirred at room temperature for 2 hours before being used for polymerization.

The 0.532 grams of Catalyst B contributed 0.1505 mmol of transition metal to Catalyst D (e.g., 0.532 grams Catalyst B×0.283 mmol TM/gram Catalyst B=0.1505 mmol TM). Accordingly, the total transition metal loading of Catalyst D was 0.292 mmol TM per gram of catalyst (e.g., [0.1505+0.0054]/[0.532+0.002]=0.292 mmol TM/gram catalyst). The molar ratio of the third transition metal component (TMCpPrCpZ) to the base catalyst was 0.036 (e.g., 0.0054 mmole TMCpPrCpZ/[(0.283 mmol TM/gram Catalyst B)*(0.532 gram Catalyst B)]=0.036). The MAO loading of Catalyst D was therefore 3.89 (e.g., 3.9 mmole/gram Catalyst B*(0.532 gram/0.534 gram)=3.89 mmol/gram catalyst).

Preparation of Catalyst E

Catalyst E, a catalyst of the present invention, was prepared by first slurrying 0.527 grams of Catalyst B in 14.167 grams of Kaydol, at room temperature, then adding 0.0050 mmole of PMCpPrCpZ (2 mg) in a 2.0 gram solution of Kaydol. The resulting mixture was stirred at room temperature for 2 hours before being used for polymerization.

The 0.527 grams of Catalyst B contributed 0.1491 mmol of transition metal to Catalyst E (e.g., 0.527 grams Catalyst B×0.283 mmol TM/gram Catalyst B=0.1491 mmol TM). Accordingly, the total transition metal loading of Catalyst E was 0.291 mmol TM per gram of catalyst (e.g., [0.1491+0.0050]/[0.527+0.002]=0.291 mmol TM/gram catalyst). The molar ratio of the third transition metal component (PMCpPrCpZ) to the base catalyst was 0.034 (e.g., 0.0050 mmole PMCpPrCpZ/[(0.283 mmol TM/gram Catalyst B)*(0.527 gram Catalyst B)]=0.034). The MAO loading of Catalyst E was therefore 3.89 (e.g., 3.9 mmole/gram Catalyst B*(0.527 gram/0.529 gram)=3.89 mmol/gram catalyst).

Preparation of Catalyst F

Catalyst F, a catalyst of the present invention, was prepared by first slurrying 0.513 grams of Catalyst B in 13.275 grams of Kaydol, at room temperature, then adding 0.0046 mmole of MeBuCpZ (2 mg) in a 2.0 gram solution of Kaydol. The resulting mixture was stirred at room temperature for 2 hours before being used for polymerization.

The 0.513 grams of Catalyst B contributed 0.1451 mmol of transition metal to Catalyst F (e.g., 0.513 grams Catalyst B×0.283 mmol TM/gram Catalyst B=0.1451 mmol TM). Accordingly, the total transition metal loading of Catalyst F was 0.291 mmol TM per gram of catalyst (e.g., [0.1451+0.0046]/[0.513+0.002]=0.291 mmol TM/gram catalyst). The molar ratio of the third transition metal component (MeBuCpZ) to the base catalyst was 0.032 (e.g., 0.0046 mmole MeBuCpZ/[(0.283 mmol TM/gram Catalyst B)*(0.513 gram Catalyst B)]=0.032). The MAO loading of Catalyst F was therefore 3.88 (e.g., 3.9 mmole/gram Catalyst B*(0.513 gram/0.515 gram)=3.88 mmol/gram catalyst).

Preparation of Catalyst G

Catalyst G, a catalyst of the present invention, was prepared by first slurrying 0.517 grams of Catalyst B in 13.391 grams of Kaydol, at room temperature, then adding 0.0196 mmole of HN3Z (12 mg) in a 2.0 gram solution of Kaydol. The resulting mixture was stirred at room temperature for 2 hours before being used for polymerization.

The 0.517 grams of Catalyst B contributed 0.1463 mmol of transition metal to Catalyst G (e.g., 0.517 grams Catalyst B×0.283 mmol TM/gram Catalyst B=0.1463 mmol TM). Accordingly, the total transition metal loading of Catalyst G was 0.291 mmol TM per gram of catalyst (e.g., [0.1463+0.0196]/[0.517+0.012]=0.314 mmol TM/gram catalyst). The molar ratio of the third transition metal component (HN3Z) to the base catalyst was 0.134 (e.g., 0.0196 mmole HN3Z/[(0.283 mmol TM/gram Catalyst B)*(0.517 gram Catalyst B)]=0.134). The MAO loading of Catalyst G was therefore 3.81 (e.g., 3.9 mmole/gram Catalyst B*(0.517 gram/0.529 gram)=3.81 mmol/gram catalyst).

Preparation of Catalyst H

Catalyst H, a catalyst of the present invention, was prepared by first slurrying 0.533 grams of Catalyst B in 13.461 grams of Kaydol, at room temperature, then adding 0.0046 mmole of HFPF (2 mg) in a 2.0 gram solution of Kaydol. The resulting mixture was stirred at room temperature for 2 hours before being used for polymerization.

The 0.533 grams of Catalyst B contributed 0.1508 mmol of transition metal to Catalyst H (e.g., 0.533 grams Catalyst B×0.283 mmol TM/gram Catalyst B=0.1508 mmol TM). Accordingly, the total transition metal loading of Catalyst H was 0.290 mmol TM per gram of catalyst (e.g., [0.1508+ 0.0046]/[0.533+0.002]=0.290 mmol TM/gram catalyst). The molar ratio of the third transition metal component (HFPF) to the base catalyst was 0.031 (e.g., 0.0046 mmole HFPF/ [(0.283 mmol TM/gram Catalyst B)*(0.533 gram Catalyst B)]=0.031). The MAO loading of Catalyst H was therefore 3.89 (e.g., 3.9 mmole/gram Catalyst B* (0.533 gram/0.535 gram)=3.89 mmol/gram catalyst).

The table below provides a summary of certain characteristics of the exemplary catalyst compositions that were prepared as described above.

were maintained. The polymerization time of each example, and other data, is provided in Table 2.

The slurry reactor was a 1 liter, stainless steel autoclave equipped with a mechanical agitator. The reactor was first dried by heating at 96° C. under a stream of dry nitrogen for 40 minutes. After cooling the reactor to 50° C., 500 ml of hexane was added to the reactor, followed by 1.0 ml of TMA in heptane (2.0 mole), water (28-30 µl) and 40 ml 1-hexene, after which the reactor was sealed. The temperature of the reactor was gradually raised to 85° C. and 90 cm$^3$ hydrogen was added. The reactor was then pressured to 200 psi (1379 kPa) with ethylene. The pre-mixed catalyst composition was then transferred to the reactor under ethylene pressure. Heat-

TABLE 1

| Catalyst | Base Catalyst | 3$^{rd}$ Transition Metal component employed | Amount of Base Catalyst used (g) | Amount of 3$^{rd}$ Transition Metal added to the Base Catalyst (mmol) | Molar ratio of 3rd Transition Metal component to Base Catalyst | Transition Metal loading of final catalyst composition (mmol TM/g cat) | MAO loading of final catalyst composition (mmolAl/g cat) |
|---|---|---|---|---|---|---|---|
| A | Catalyst 1 | Not applicable | Not applicable | Not applicable | 0 | 0.302 | 4.1 |
| C | Catalyst 1 | BuCpZCl | 1.076 | 0.0247 | 0.076 | 0.322 | 4.06 |
| B | Catalyst 2 | Not applicable | Not applicable | Not applicable | 0 | 0.283 | 3.9 |
| D | Catalyst 2 | TMCpPrCpZ | 0.532 | 0.0054 | 0.036 | 0.292 | 3.89 |
| E | Catalyst 2 | PMCpPrCpZ | 0.527 | 0.0050 | 0.028 | 0.291 | 3.89 |
| F | Catalyst 2 | MeBuCpZ | 0.513 | 0.0046 | 0.032 | 0.291 | 3.88 |
| G | Catalyst 2 | HN3Z | 0.517 | 0.0196 | 0.134 | 0.314 | 3.81 |
| H | Catalyst 2 | HfPF | 0.533 | 0.0046 | 0.031 | 0.290 | 3.89 |

Polymerization Process for Examples 1-9:

In each of Examples 1-9, polyethylene was produced in a slurry phase reactor using a catalyst composition prepared as described above, and indicated in Table 2 below. For each of Examples 1-9, a Kaydol oil slurry of one of the catalyst compositions of the invention or control examples was prepared using the specific procedure described above. An aliquot of this slurry mixture was added to a 50 ml stainless steel bomb containing 50 ml of hexane. Anhydrous conditions ing was continued until a polymerization temperature of 95° C. was attained. During the time in which polymerization occurred (the "Run Time" in Table 2), ethylene was continually added to the reactor to maintain a constant pressure. At the end of reaction, the reactor was vented and opened.

Figure 2:
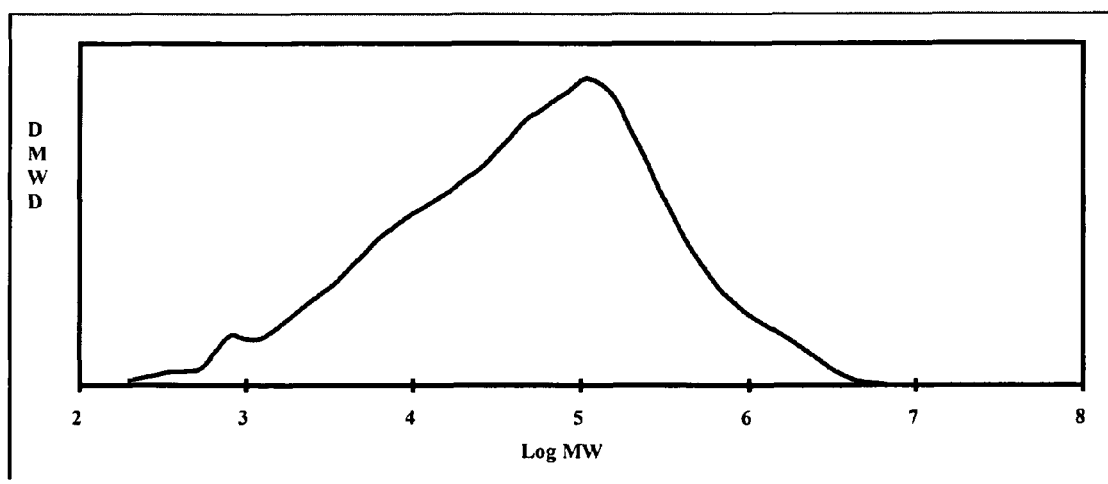
FIG. 2 illustrates a molecular weight distribution for an exemplary supported, treated catalyst system of the present invention.
Figure 3:
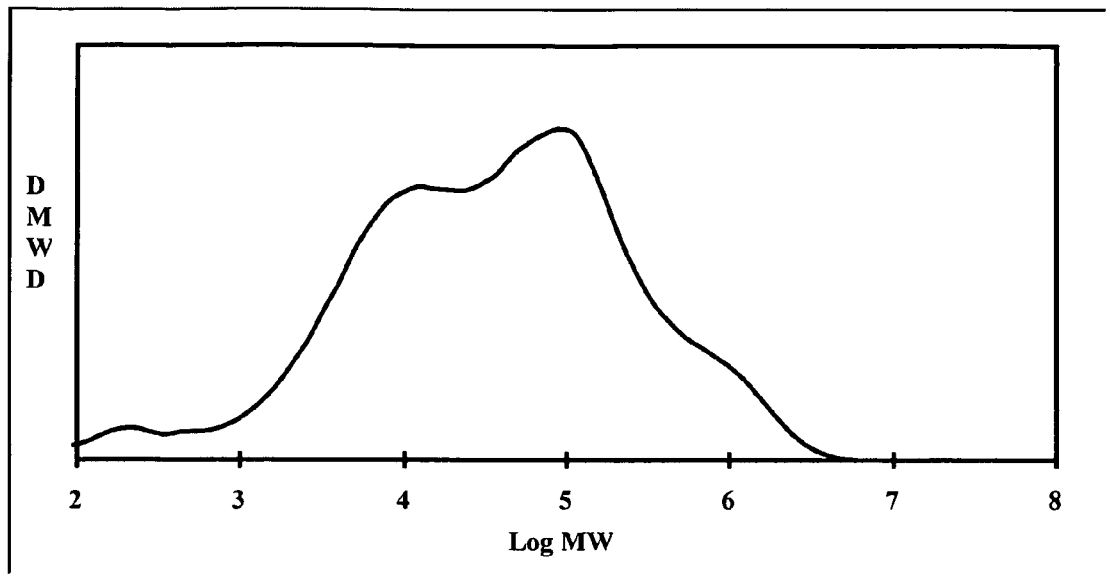
FIG. 3 illustrates a molecular weight distribution for an exemplary supported, treated catalyst system of the present invention.
Figure 4:
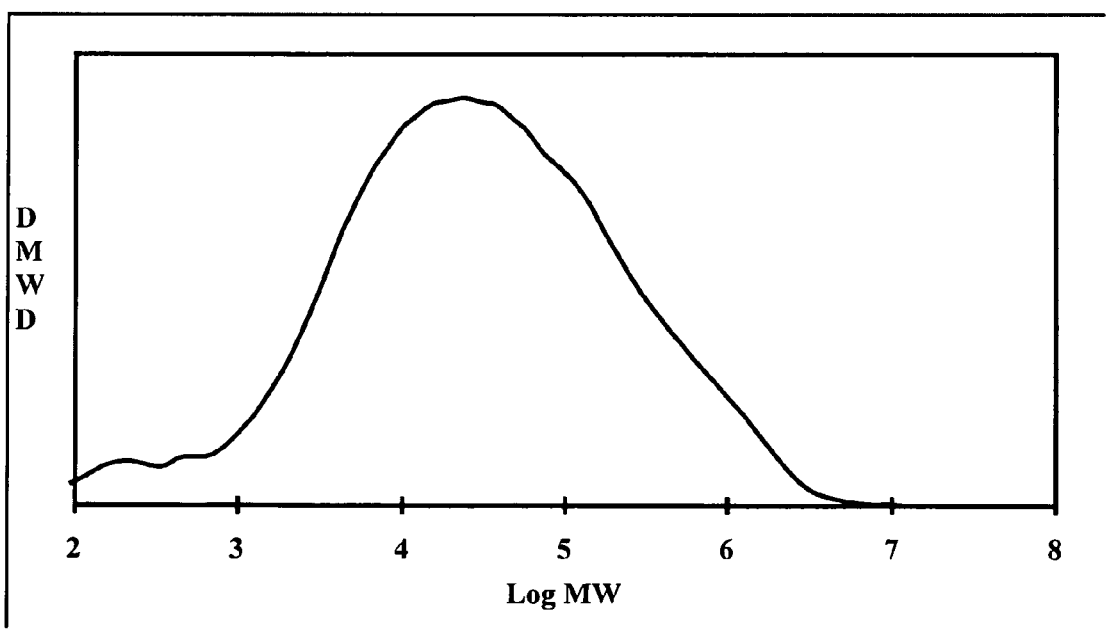
FIG. 4 illustrates a molecular weight distribution for an exemplary supported, treated catalyst system of the present invention.
Figure 5:
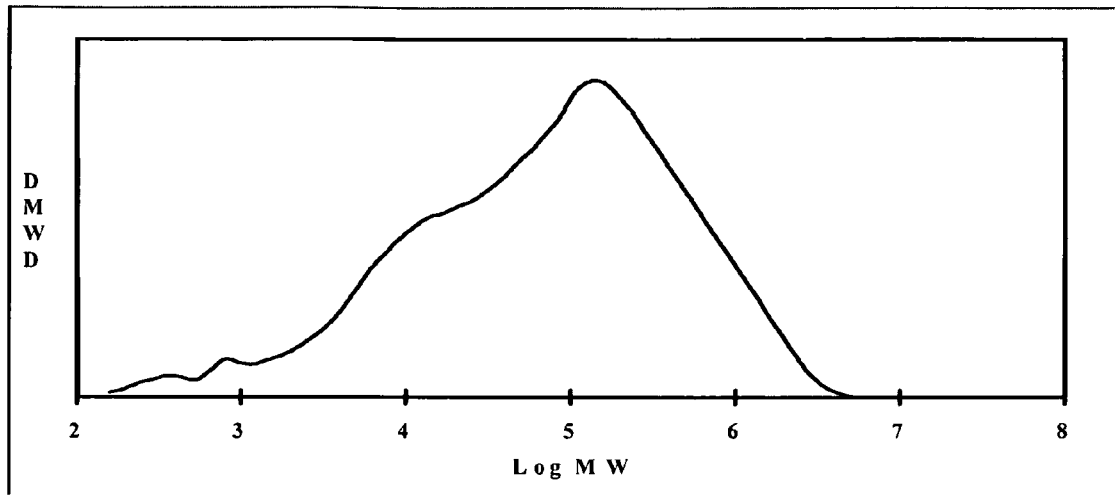
FIG. 5 illustrates a molecular weight distribution for an exemplary supported, treated catalyst system of the present invention.
Figure 6:
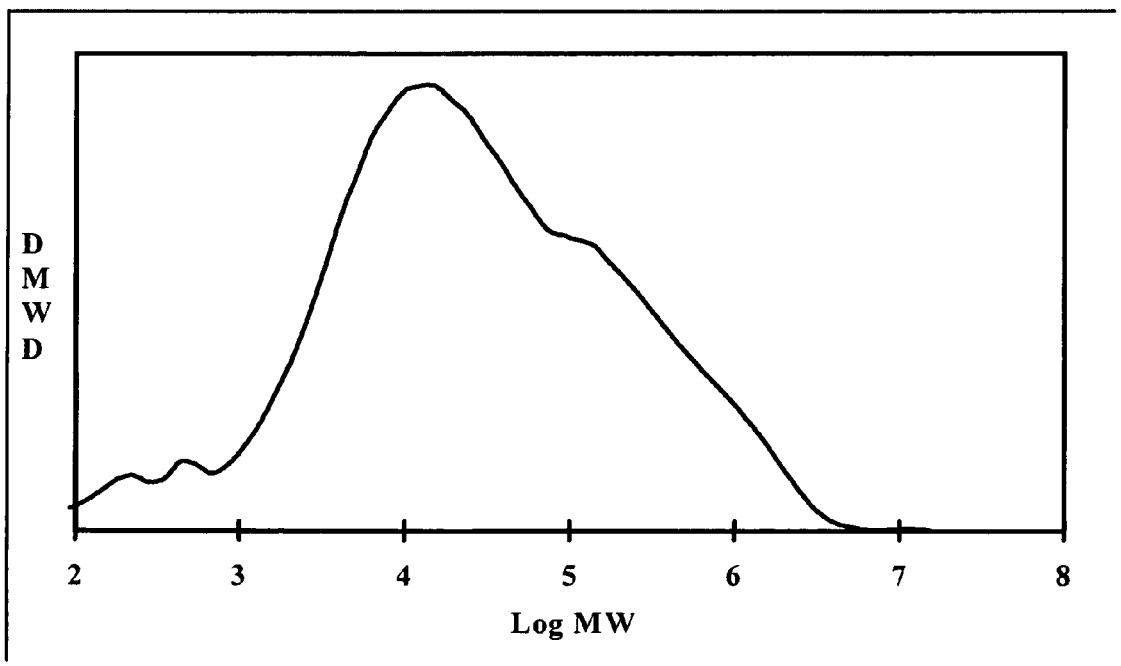
FIG. 6 illustrates a molecular weight distribution for an exemplary supported, treated catalyst system of the present invention.

FIGS. 1 through 6 illustrate exemplary molecular weight distributions for the polymer product formed by exemplary polymerization reactions involving Catalysts B, E, G, D, H, and F, respectively.

TABLE 2

| Example | Catalyst | Amount of solid catalyst used (g) | Run Time (min) | Yield (g) | Productivity | % Change in Productivity | MAO Efficiency | Mw | PDI |
|---|---|---|---|---|---|---|---|---|---|
| 1 | Catalyst A | 0.0328 | 60 | 144.3 | 4399 | N/A | 1076 | 316261 | 14.8 |
| 2 | Catalyst C | 0.0340 | 50 | 174 | 6141 | 40 | 1513 | 241597 | 17.8 |
| 3 | Catalyst B | 0.0368 | 30 | 60.2 | 3272 | N/A | 836 | 168838 | 39.3 |
| 4 | Catalyst D | 0.0324 | 30 | 87.5 | 5401 | 65 | 1389 | 159560 | 50.5 |
| 5 | Catalyst E | 0.0305 | 30 | 122.8 | 8052 | 146 | 2064 | 194840 | 24.1 |
| 6 | Catalyst F | 0.0318 | 30 | 74.1 | 4660 | 42 | 1205 | 167910 | 57.4 |
| 7 | Catalyst G | 0.0368 | 30 | 67.6 | 3674 | 12 | 966 | 165574 | 45.2 |
| 8 | Catalyst H | 0.0321 | 30 | 70.8 | 4411 | 35 | 1133 | 255850 | 29.9 |

Results from Table 2 demonstrate, inter alia, that the present invention achieves increased overall productivity and MAO efficiency over the unmodified system. Additionally, the PDI values indicate, and FIGS. 1-6 illustrate, that this invention provides a means to tailor the molecular weight distribution of the resulting polymers.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

What is claimed is:

1. A process for polymerizing olefins comprising contacting, in a reactor:
   (a) ethylene and at least one comonomer selected from the group consisting of C4 to C8 alpha olefins; and
   (b) a supported, treated catalyst system that comprises:
      a first catalyst compound and a second catalyst compound supported on a common support, wherein the first catalyst compound is a non-metallocene catalyst component and the second catalyst compound is a metallocene catalyst component, and wherein the first catalyst compound and the second catalyst compound comprise Group 4 or 5 metals, and
      at least one compound that can be activated by methylalumoxane, wherein said compound is different from the first catalyst compound and the second catalyst compound and wherein said compound is a metallocene catalyst compound, a Group-15-component-containing compound, or a phenoxide catalyst compound;
   wherein the supported, treated catalyst system is produced by the process comprising:
      forming a supported bimetallic catalyst system comprising the first catalyst compound and the second catalyst compound; and
      contacting the supported bimetallic catalyst system with the at least one compound that can be activated by methylalumoxane.

2. The process of claim 1 wherein the polymerization process is a gas phase process.

3. The process of claim 1 wherein the polymerization process is a slurry process.

4. The process of claim 1 wherein the supported, treated catalyst system further comprises an activator.

5. The process of claim 1, wherein the common support is selected from the group consisting of: silica, alumina, silica-alumina, magnesium chloride, graphite, and mixtures thereof.

6. The process of claim 4 wherein the activator is selected from the group consisting of: a Lewis acid, an alkylaluminum compound, and an ionic activator.

7. The process of claim 6 wherein the Lewis acid is methylalumoxane.

8. The process of claim 6 wherein the alkylaluminum compound is trimethylaluminum.

9. The process of claim 1, wherein the at least one compound that can be activated by methylalumoxane comprises a transition metal that is the same as the transition metal in the first catalyst compound.

10. The process of claim 1, wherein the at least one compound that can be activated by methylalumoxane comprises a transition metal that is the same as the transition metal in the second catalyst compound.

11. The process of claim 1, wherein the at least one compound that can be activated by methylalumoxane comprises a transition metal that is different from transition metals in the first and second catalyst compounds.

12. The process of claim 1 wherein the metallocene catalyst compound is represented by a formula selected from the group consisting of:

$$Cp^A Cp^B MX_n;$$

$$Cp^A(A)Cp^B MX_n;$$

$$Cp^A(A)QMX_r;$$

$$Cp^A MQ_q X_w;$$

$$Cp^A M(W_2 GZ)X_y; \text{ and}$$

$$T(Cp^A M(W_2 GZ)X_y)_m$$

wherein M is a metal atom selected from the group consisting of: Group 4 or 5 metal atoms;
   Cp is a ligand selected from the group consisting of: substituted or unsubstituted cyclopentadienyl ligands and ligands isolobal to cyclopentadienyl;
   X is selected from the group consisting of: halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, $C_1$ to $C_{12}$ heteroatom-containing hydrocarbons and substituted derivatives thereof; amines, phosphines, ethers, carboxylates, dienes, and hydrocarbon radicals having from 1 to 20 carbon atoms;
   (A) is a bridging group;
   Q is a heteroatom-containing ligand;
   T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups;
   G is selected from the group consisting of carbon and silicon;
   W is selected from the group consisting of —O—; —NR—; —CR$_2$— and —S—;
   R is selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, C1 to C10 alkoxys, and $C_6$ to $C_{12}$ aryloxys;
   Z is selected from the group consisting of R, —OR, —NR$_2$, —CR$_3$, —SR, —SiR$_3$, —PR$_2$, and hydride;
   each X is chemically bonded to M;
   each Cp group is chemically bonded to M;
   m is an integer in the range of from 1 to 7;
   n is 0 or an integer from 1 to 4;
   q is in the range of from 0 to 3;
   r is 0, 1 or 2;
   w is in the range of from 0 to 3; and
   y is 1 or 2.

13. The process of claim 1 wherein the metallocene catalyst compound is represented by a formula selected from the group consisting of:

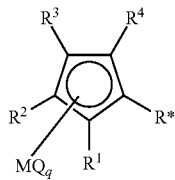

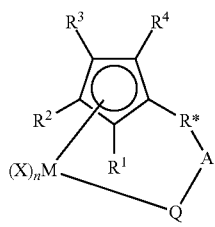

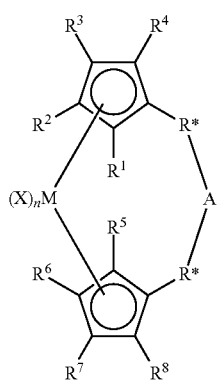

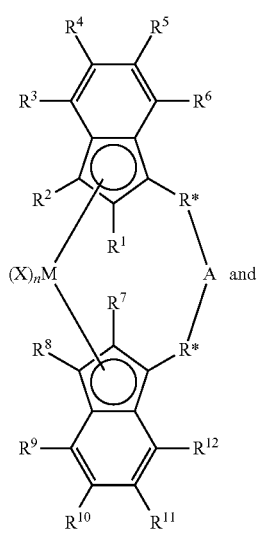

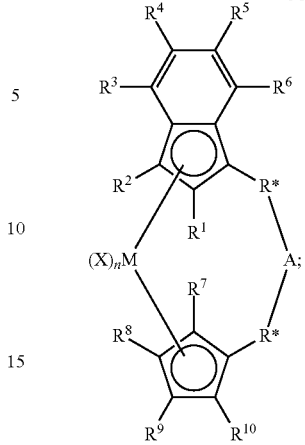

wherein M is a metal atom selected from the group consisting of: Group 4 or 5 metal atoms;

Q is selected from the group consisting of halogen ions, alkyls, alkylenes, aryls, arylenes, alkoxys, aryloxys, amines, alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates, fluorinated alkyls, fluorinated aryls, and fluorinated alkylcarboxylates;

q is an integer ranging from 1 to 3;

each R* is independently selected from the group consisting of hydrocarbyls and heteroatom-containing hydrocarbyls;

A is a bridging group;

X is selected from the group consisting of: halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, $C_1$ to $C_{12}$ heteroatom-containing hydrocarbons and substituted derivatives thereof; amines, phosphines, ethers, carboxylates, dienes, and hydrocarbon radicals having from 1 to 20 carbon atoms;

n is 0 or an integer from 1 to 4; and $R^1$ through $R^{12}$ are independently selected from the group consisting of hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof.

14. The process of claim 1 wherein the metallocene catalyst compound is selected from the group consisting of:
bis(n-butylcyclopentadienyl)zirconium dichloride;
bis(n-butylcyclopentadienyl)zirconium difluoride;
(tetramethylcyclopentadienyl)(n-propylcyclopentadienyl) zirconium dichloride;
(pentamethylcyclopentadienyl)(n-propylcyclopentadienyl)zirconium dichloride;
bis(1,3-methylbutylcyclopentadienyl)zirconium dichloride; and
bis(n-propylcyclopentadienyl)hafnium difluoride.

15. The process of claim 1 wherein the supported, treated catalyst system and the supported bimetallic catalyst system each have a transition metal concentration, and wherein the supported, treated catalyst system has a higher transition metal concentration than does the supported bimetallic catalyst system.

16. The process of claim 1 wherein the first catalyst compound is a Ziegler-Natta catalyst.

17. The process of claim 16 wherein the Ziegler-Natta catalyst comprises a compound selected from the group consisting of Group 4 and Group 5 halides, oxides, oxyhalides, alkoxides, and mixtures thereof.

18. The process of claim 17 wherein the Ziegler-Natta catalyst is titanium tetrachloride.

19. The process of claim 1 wherein the Group-15-component-containing compound is represented by a formula selected from the group consisting of:

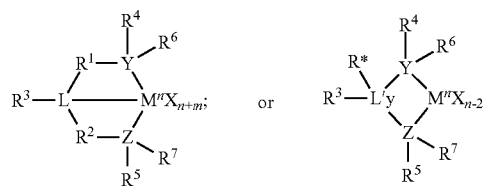

wherein M is selected from the group consisting of: Group 3 to 12 transition metals and Group 13 to 14 main group metals;

each X is a leaving group;

y is 0 or 1;

n is the oxidation state of M and is selected from the group consisting of: +3, +4, and +5;

m is the formal charge of the YZL or the YZL' ligand and is selected from the group consisting of 0, −1, −2 and −3;

L is a Group 15 or 16 element;

L' is selected from the group consisting of: a Group 15 element, a Group 16 element, and a Group 14-containing group;

Y is a Group 15 element;

Z is a Group 15 element;

$R^1$ and $R^2$ are each selected from the group consisting of: a $C_1$ to $C_{20}$ hydrocarbon group, a heteroatom containing group having up to twenty carbon atoms, silicon, germanium, tin, lead, halogen and phosphorus;

$R^3$ is absent or is selected from the group consisting of: a hydrocarbon group, hydrogen, a halogen, and a heteroatom containing group;

$R^4$ and $R^5$ are each selected from the group consisting of: an alkyl group, an aryl group, a substituted aryl group, a cyclic alkyl group, a substituted cyclic alkyl group, a cyclic aralkyl group, a substituted cyclic aralkyl group or multiple ring system having up to 20 carbon atoms, a $C_1$ to $C_{20}$ hydrocarbon group, a $C_1$ to $C_{20}$ aryl group, a $C_1$ to $C_{20}$ aralkyl group, and a heteroatom containing group;

$R^6$ and $R^7$ are each absent, or are selected from the group consisting of: hydrogen, an alkyl group, a halogen, a heteroatom or a hydrocarbyl group; and R* is absent or is selected from the group consisting of: hydrogen, a Group 14 atom containing group, a halogen, and a heteroatom containing group.

20. The process of claim 19 wherein the Group-15-component-containing compound is

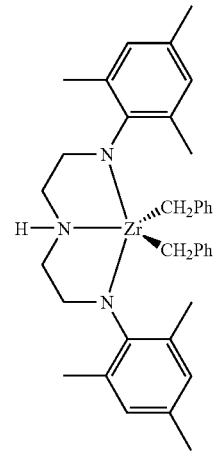

wherein Ph represents a phenyl group.

21. The process of claim 1 wherein the phenoxide catalyst compound is represented by a formula selected from the group consisting of:

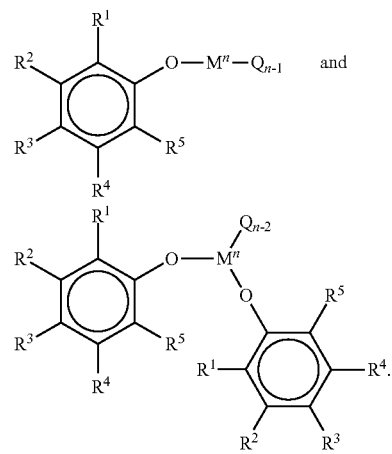

wherein $R^1$ is selected from the group consisting of: hydrogen and a $C_4$ to $C_{100}$ group;

at least one of $R^2$ to $R^5$ is a heteroatom-containing group;

each of $R^2$ to $R^5$ that is not a heteroatom-containing group is selected from the group consisting of: hydrogen and a $C_1$ to $C_{100}$ group;

O is oxygen;

M is selected from the group consisting of: Group 3 to Group 10 transition metals and lanthanide metals;

n is the valence state of the metal M and is selected from the group consisting of 2, 3, 4, and 5; and Q is an alkyl, halogen, benzyl, amide, carboxylate, carbamate, thiolate, hydride or alkoxide group.

22. The process of claim 1, wherein the at least one compound that can be activated by methylalumoxane is selected from the group consisting of:

complexes of nickel;

complexes of nickel and palladium;

Group 8 to 10 metal catalyst compounds comprising a diimine ligand;
Group 5 and 6 metal imido complexes;
bridged bi-aromatic ligand compounds;
and compounds represented by the formula $$((Z)XA_t(YJ))_q MQ_n$$

where M is a metal selected from Group 3 to 13 or lanthanide and actinide series of the Periodic Table of Elements;
Q is bonded to M and each Q is a monovalent, bivalent, or trivalent anion;
X and Y are bonded to M;
X and Y are heteroatoms;
Y is contained in a heterocyclic ring J, where J comprises from 2 to 50 non-hydrogen atoms,
Z is bonded to X, where Z comprises 1 to 50 non-hydrogen atoms;
t is 0 or 1;
A is a bridging group joined to at least one of X, Y or J;
q is 1 or 2;
n is an integer from 1 to 4.

23. The process of claim 1 wherein the supported, treated catalyst system has a productivity of at least 4,500 grams polymer/gram catalyst hour.

24. The process of claim 1 wherein the supported, treated catalyst system has a productivity of at least 5,000 grams polymer/gram catalyst hour.

25. The process of claim 1 wherein the supported, treated catalyst system has a productivity of at least 6,000 grams polymer/gram catalyst hour.

26. The process of claim 1 wherein the supported, treated catalyst system has a productivity of at least 7,000 grams polymer/gram catalyst hour.

27. The process of claim 1 wherein the supported, treated catalyst system has a methylalumoxane efficiency of at least 1,100.

28. The process of claim 1 wherein the supported, treated catalyst system has a methylalumoxane efficiency of at least 2,000.

29. The process of claim 1 wherein an antistatic agent is present in the supported, treated catalyst system in an amount less than 2% by weight of the supported, treated catalyst system.

30. The process of claim 1 wherein an antistatic agent is present in the supported, treated catalyst system in an amount in the range of from 0% to 1% by weight of the supported, treated catalyst system.

31. The process of claim 1 wherein the supported, treated catalyst system and the supported bimetallic catalyst system each have a productivity, and wherein the productivity of the supported, treated catalyst system is greater than the productivity of the supported bimetallic catalyst system.

32. The process of claim 1 wherein the supported bimetallic catalyst system and the supported, treated catalyst system each have a methylalumoxane efficiency, and wherein the supported, treated catalyst system has a greater methylalumoxane efficiency than that of the supported bimetallic catalyst system.

* * * * *